US012579258B2

(12) United States Patent
Avadhanam

(10) Patent No.:  US 12,579,258 B2
(45) Date of Patent:      Mar. 17, 2026

(54) ADVANCED PERSISTENT THREAT DETECTION

(71) Applicant: Oracle International Corporation, Redwood Shores, CA (US)

(72) Inventor: Phani Bhushan Avadhanam, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 46 days.

(21) Appl. No.: 18/110,271

(22) Filed: Feb. 15, 2023

(65) Prior Publication Data

US 2024/0273193 A1      Aug. 15, 2024

(51) Int. Cl.
*G06F 21/55*               (2013.01)

(52) U.S. Cl.
CPC .......... *G06F 21/554* (2013.01); *G06F 21/552* (2013.01)

(58) Field of Classification Search
CPC .............................. G06F 21/554; G06F 21/552
See application file for complete search history.

(56) References Cited

U.S. PATENT DOCUMENTS

| | | | |
|---|---|---|---|
| 9,665,715 B1 * | 5/2017 | Roundy ................ | G06F 21/552 |
| 10,200,259 B1 * | 2/2019 | Pukish .................. | H04L 69/326 |
| 10,901,918 B2 | 1/2021 | Ramasamy et al. | |
| 12,518,006 B2 | 1/2026 | Avadhanam | |
| 2004/0153672 A1 * | 8/2004 | Watt ........................ | G06F 21/74 |
| | | | 726/22 |

| | | | |
|---|---|---|---|
| 2010/0235647 A1 * | 9/2010 | Buer ........................ | G06F 21/52 |
| | | | 717/136 |
| 2015/0096024 A1 * | 4/2015 | Haq .................... | H04L 63/1416 |
| | | | 726/23 |
| 2015/0128274 A1 * | 5/2015 | Giokas .................. | H04L 51/212 |
| | | | 726/23 |
| 2016/0173525 A1 * | 6/2016 | Thomas ................ | H04L 63/145 |
| | | | 726/23 |

(Continued)

FOREIGN PATENT DOCUMENTS

| | | | | |
|---|---|---|---|---|
| WO | WO-2018110735 A1 * | 6/2018 | ............. | G06F 16/00 |

OTHER PUBLICATIONS

U.S. Appl. No. 18/110,268 , Non-Final Office Action, Mailed on Jan. 16, 2025, 8 pages.

*Primary Examiner* — Stephen T Gundry
*Assistant Examiner* — Aayush Aryal
(74) *Attorney, Agent, or Firm* — Kilpatrick Townsend & Stockton LLP

(57)                    ABSTRACT

Techniques are described herein for advanced persistent threat detection. An example method can include a device receiving a message identifying an instruction loaded onto an instruction cache of a secure processer. The device can transmit a control instruction to configure a kernel image to collect a metric over a first time interval, the metric being generated based at least in part on the secure processor executing the instruction during the first time interval. The device can receive the first metric from the kernel image, the metric being indicative of a transition of the secure processor from a non-secure state to a secure state. The device can determine whether the secure processor is undergoing a computing attack based on the metric. The device can transmit the determination of whether the secure processor is undergoing a computing attack to a sender of the message.

18 Claims, 14 Drawing Sheets

100

(56)                    References Cited

U.S. PATENT DOCUMENTS

| 2017/0093804 | A1* | 3/2017 | Boivie | H04L 9/3263 |
| 2017/0244731 | A1* | 8/2017 | Hu | H04L 63/1425 |
| 2018/0032724 | A1* | 2/2018 | Tang | G06F 21/552 |
| 2018/0048667 | A1* | 2/2018 | Tang | H04L 41/145 |
| 2018/0307807 | A1 | 10/2018 | Tronel | |
| 2021/0019409 | A1* | 1/2021 | Parshin | G06F 21/53 |
| 2021/0203676 | A1* | 7/2021 | Pendse | H04L 63/1416 |
| 2021/0248433 | A1* | 8/2021 | Dabon | G06K 15/1893 |
| 2021/0400058 | A1* | 12/2021 | Filonov | G06N 3/09 |

* cited by examiner

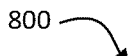

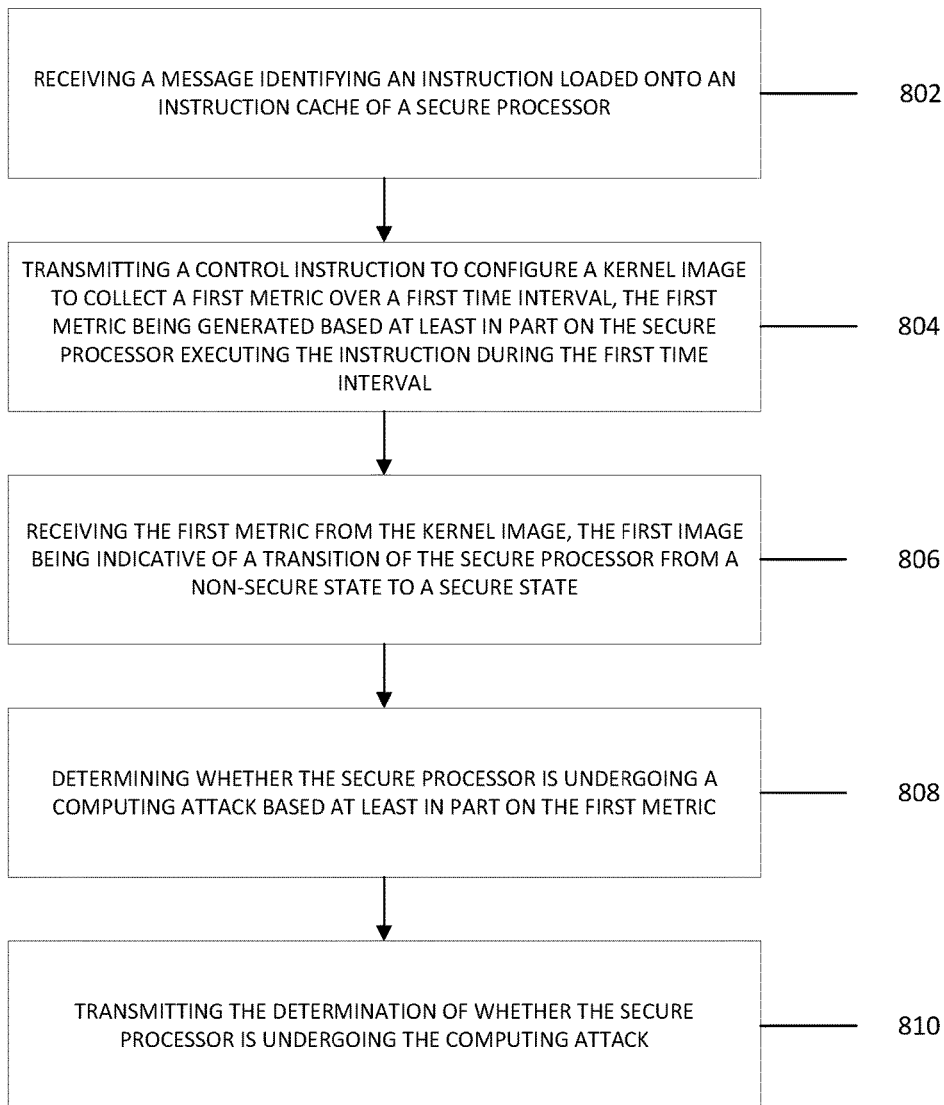

800

RECEIVING A MESSAGE IDENTIFYING AN INSTRUCTION LOADED ONTO AN INSTRUCTION CACHE OF A SECURE PROCESSOR — 802

TRANSMITTING A CONTROL INSTRUCTION TO CONFIGURE A KERNEL IMAGE TO COLLECT A FIRST METRIC OVER A FIRST TIME INTERVAL, THE FIRST METRIC BEING GENERATED BASED AT LEAST IN PART ON THE SECURE PROCESSOR EXECUTING THE INSTRUCTION DURING THE FIRST TIME INTERVAL — 804

RECEIVING THE FIRST METRIC FROM THE KERNEL IMAGE, THE FIRST IMAGE BEING INDICATIVE OF A TRANSITION OF THE SECURE PROCESSOR FROM A NON-SECURE STATE TO A SECURE STATE — 806

DETERMINING WHETHER THE SECURE PROCESSOR IS UNDERGOING A COMPUTING ATTACK BASED AT LEAST IN PART ON THE FIRST METRIC — 808

TRANSMITTING THE DETERMINATION OF WHETHER THE SECURE PROCESSOR IS UNDERGOING THE COMPUTING ATTACK — 810

FIG. 8

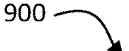

900

RECEIVING A FIRST MESSAGE THAT A METRIC COLLECTED FROM A FIRST SECURE PROCESSOR HAS EXCEEDED A THRESHOLD, THE METRIC EXCEEDING THE THRESHOLD BEING INDICATIVE OF A COMPUTING ATTACK, THE FIRST SECURE PROCESSOR BEING AN ELEMENT OF A FIRST NODE OF A NETWORK — 902

TRANSMITTING A FIRST CONTROL INSTRUCTION OVER THE NETWORK TO TRANSITION A SECOND SECURE PROCESSOR FROM THE FIRST NODE TO A SECOND NODE OF THE NETWORK BASED AT LEAST IN PART ON THE FIRST MESSAGE — 904

TRANSMITTING A SECOND CONTROL INSTRUCTION OVER THE NETWORK TO SUSPEND THE FIRST NODE FROM RECEIVING A WORKFLOW REQUEST — 906

DETERMINING WHETHER THE FIRST SECURE PROCESSOR IS A VICTIM OF A COMPUTING ATTACK BASED AT LEAST IN A PART ON THE METRIC — 908

TRANSMITTING THE DETERMINATION OF WHETHER THE FIRST SECURE PROCESSOR IS UNDERGOING THE COMPUTING ATTACK — 910

RECEIVING A SECOND MESSAGE THAT THE COMPUTING ATTACK HAS BEEN MITIGATED WITH RESPECT TO THE FIRST NODE — 912

FIG. 9

ADVANCED PERSISTENT THREAT DETECTION

BACKGROUND

A cloud service provider (CSP) can provide multiple cloud services to subscribing customers. These services are provided under different models, including a Software-as-a-Service (SaaS) model, a Platform-as-a-Service (PaaS) model, an Infrastructure-as-a-Service (IaaS) model, and others.

BRIEF SUMMARY

Embodiments described herein are directed toward a method for advanced persistent threat detection. The method can include a computing device receiving a message identifying an instruction loaded onto an instruction cache of a secure processer.

The method can further include the computing device transmitting a control instruction to configure a kernel image to collect a first metric over a first time interval, the first metric being generated based at least in part on the secure processor executing the instruction during the first time interval.

The method can further include the computing device receiving the first metric from the kernel image, the first metric being indicative of a transition of the secure processor from a non-secure state to a secure state.

The method can further include the computing device determining whether the secure processor is undergoing a computing attack based at least in part on the first metric.

The method can further include the computing device transmitting the determination of whether the secure processor is undergoing the computing attack to a sender of the message.

Embodiments can further include a computing device, including a processor and a computer-readable medium including instructions that, when executed by the processor, can cause the processor to perform operations including receiving a message identifying an instruction loaded onto an instruction cache of a secure processer.

The instructions that, when executed by the processor, can further cause the processor to perform operations including transmitting a control instruction to configure a kernel image to collect a first metric over a first time interval, the first metric being generated based at least in part on the secure processor executing the instruction during the first time interval.

The instructions that, when executed by the processor, can further cause the processor to perform operations including receiving the first metric from the kernel image, the first metric being indicative of a transition of the secure processor from a non-secure state to a secure state.

The instructions that, when executed by the processor, can further cause the processor to perform operations including determining whether the secure processor is undergoing a computing attack based at least in part on the first metric.

The instructions that, when executed by the processor, can further cause the processor to perform operations including transmitting the determination of whether the secure processor is undergoing the computing attack to a sender of the message.

Embodiments can further include a non-transitory computer-readable medium having stored thereon instructions that, when executed by a processor, causes the processor to perform operations including receiving a message identifying an instruction loaded onto an instruction cache of a secure processer.

The instructions that, when executed by the processor, can further cause the processor to perform operations including transmitting a control instruction to configure a kernel image to collect a first metric over a first time interval, the first metric being generated based at least in part on the secure processor executing the instruction during the first time interval.

The instructions that, when executed by the processor, can further cause the processor to perform operations including receiving the first metric from the kernel image, the first metric being indicative of a transition of the secure processor from a non-secure state to a secure state.

The instructions that, when executed by the processor, can further cause the processor to perform operations including determining whether the secure processor is undergoing a computing attack based at least in part on the first metric.

The instructions that, when executed by the processor, can further cause the processor to perform operations including transmitting the determination of whether the secure processor is undergoing the computing attack to a sender of the message.

BRIEF DESCRIPTION OF THE DRAWINGS

FIG. 8 is a process flow for identifying a computing attack, according to one or more embodiments.

FIG. 9 is a process flow for mitigating a computing attack, according to one or more embodiments.

DETAILED DESCRIPTION

Figure 1:
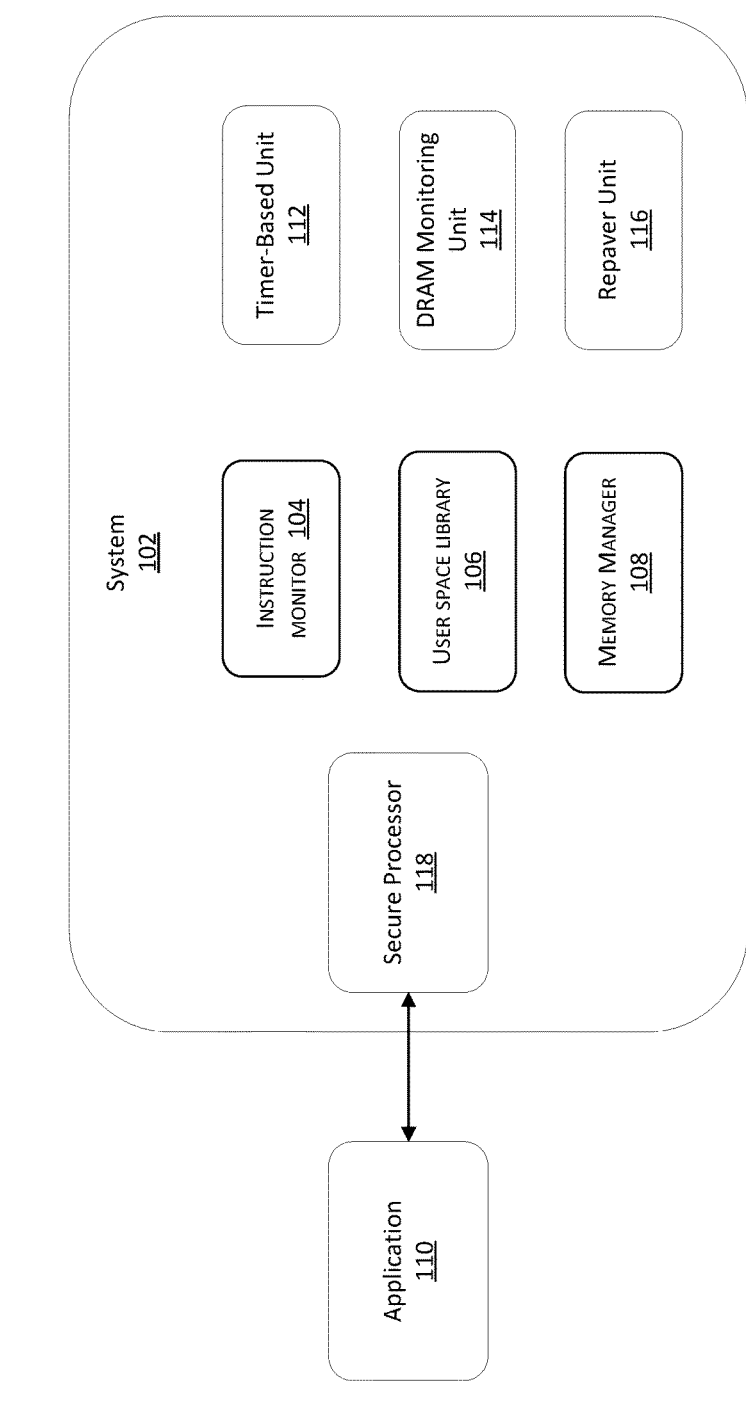
FIG. 1 is an illustration of a system configured for the identification and mitigation of a computing attack, according to one or more embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described Cloud service providers manage vast cloud infrastructures against malicious actors that want to use computing attacks to inject malware into the overall cloud computing system. Malware can include various forms of viruses that a malicious actor can use to access sensitive information or disrupt the transmission or receipt of information. An example computing attack is an advanced persistent threat (APT) attack. A computing attack can be a sustained attack in which a malicious attacker can insert code onto a computing device undetected. This can be performed through various techniques such as social engineering techniques, such as phishing emails. Once the malicious actor has established communication with a computer, malware is inserted and spread throughout the infected computer's network. The computing attack techniques can be used to spread the malware and are designed to specifically avoid the network's security measures. For example, if the initial insertion of malware is directed toward a computer in the marketing department, the spread can be specifically designed to enter the accounting department files, legal department files, and information technology department files without detection. Furthermore, rather than quickly enter a network, cause damage and leave, a computing attack can be a long and sustained attack that gathers as much information from a victim system as possible. Throughout the sustained attack period, the computing attack can result in a massive amount of the data being extracted by the malicious actor. Traditional malware detection techniques can be designed for traditional "hit and run" attacks, and therefore unequipped to detect sustained computing attacks.

Embodiments described herein address the above-referenced issues by providing techniques configuring software and processor-level architecture for the detection of a computing attack. The software and the processor-level architecture can be configured to detect the behaviors of hardware-specific instruction sets that are used to communicate between a compute instance and a secure processor (e.g., advanced reduced instruction set computer (RISC) machine (ARM) Trustzone processor, Advanced Microdevices (AMD) secure processor, Intel hardware security module (HSM)). A secure processor can be a processor that is coupled to a motherboard for a compute instance with other non-secure processors. As opposed to the non-secure processors, the secure processor has secure interfaces, that only a limited number of entities have permission to transmit or receive data from the secure processor. In some instances, the only hardware element that can transmit or receive from the secure processor is a central processing unit (CPU). The secure processor can include a limited assembly instruction set. Real-world applications of a secure processor include secure storage on a smartphone or a payment processing hardware. Key performance indicators (KPIs) can be extracted from the behavior to determine whether there is an indication of a computing attack. The KPIs can include, for example, transitions of a secure processor from a secure mode to a non-secure mode, and a comparison of transitions from a non-secure mode to a secure mode versus the transitions from a secure mode to a non-secure mode. The model can further be used to distinguish between transient vs. sustained state changes to assist with the detection of false positives.

The embodiments described herein can be used to identify the hardware-level instructions that are of interest. For example, a set of hardware-level instructions that can be indicative of a computing attack can be included in an image of a compute instance. The embodiments herein can be used to identify those instructions that can be indicative of a computing attack.

Additionally, the embodiments here can be used to identify hardware-level instructions of interest in a heterogenous compute instance. For example, a compute instance may use multiple secure processors of different manufacturers and/or models (e.g., a first secure processor produced by manufacturer A and a second secure processor produced by manufacturer B).

The collected KPIs can be analyzed using a model (weighted model, stochastic model). The KPIs and various parameters of a computing instance (e.g., a fleet size of a processor, a number of computing instances that are running in a particular shape (e.g., combination of a central processing unit (CPU), memory, and local storage)) can be used to generate inputs for the model. The model can use the inputs to output a confidence score that is indicative of whether a compute instance is under a particular attack (e.g., APT attack). The model can further be used to determine whether the KPIs are indicative of a particular form of computing attack (e.g., APT attack) or a false positive, where a false positive can be another form of computing attack (e.g., a non-APT virus).

The KPIs can be configurable to target various forms of computing attacks (e.g., APT attacks). For example, one KPI can be based on the entry and exit instructions for a secure processor in a secure mode versus the entry and exit instructions of the secure processor in a non-secure mode. Secure processing techniques can enable a computing system's hardware and software to be partitioned into secure and non-secure states. In these instances, non-secure software can access non-secure hardware, software, and memory, whereas secure software can access both secure and non-secure hardware, software, and memory. The memory, for example, can be partitioned into secure regions, and non-secure regions. These memory regions can be protected by memory barriers and statically mapped to instructions sets corresponding to a particular secure processor execution mode. The system can include a list of authorized instructions for each secure processor. The KPI can further be configured to distinguish between authorized instructions that have been mapped to one or more memory regions and false instructions that have been mapped to one or more memory region. A false instruction can be an instruction that has not been verified by an authorized manufacturer or vender. Furthermore, a false instruction being mapped to a memory region can be indicative of an APT attack.

The herein-described framework can be used to continuously monitor the hardware instruction sets to continuously protect against computing attacks. An artifact (parameters indicative of a computing attack) can be memory mapped to allow a central processing unit to make decisions as to how to respond to a detected computing attack. Once a computing attack has been detected, the framework can be used to migrate workloads to compute instances that have not been infected with a computing virus. For example, if a cloud service provider has a data center in, for example, Phoenix that is the victim of a computing attack, the herein-described framework can reroute the traffic to another data center in, for example, Washington. In another example, if a computing attack is targeting one processor type-based resource (manufacturer A processor), the herein-described framework can be used to redirect workflows to another process type-based resource (manufacturer B processor).

The below description of the computing attack identification is described in relation to APT attacks. It should be appreciated that the herein-described techniques can be used for identification of other forms of sustained computing attacks on a computing system, such a personal computer or cloud network.

FIG. 1 is an illustration 100 of a system configured for the identification and mitigation of a computing attack, according to one or more embodiments. The system 102 can assume various architectures and embodiments architectures are described with respect to FIGS. 10-13. The system 102 can include an instruction monitor 104 for detecting and monitoring hardware specific instructions at a kernel level. The instruction monitor 104 can, for example, detect and monitor the hardware specific instructions as the instructions are read into an instruction cache from memory or when assembly-level instructions are executed. The instruction monitor 104 can include low-level memory monitoring resources to detect hardware instructions.

The system 102 can further include a user space library 106, including a collection of functions that can act as a listener for secure processor instructions parameters. The parameters that are of interest can be user configurable and include, for example, the number of times an instruction was executed in a week, which process executed which instruction, the context of an instruction. For example, if an instruction is executed one hundred times in one week and one million times in the following week, there can be an indication of an APT attack.

The user space library 106 can be software that enables communication between an operating system and an application executing on the operating system. In some embodiments, the user space library 106 can be multiplexed across libraries at the platform layer of a cloud environment.

The system 102 can further include a memory manager 108 (e.g., a kernel level manager). A memory manager 108 can interact with a memory map of instruction addresses and monitors cache mapping and un-mapping functions. Each time that an application 110 is introduced into a cloud to a cloud computing instance, the application 110 provides a set of instructions for interacting with the hardware. If the instructions require more memory, the mapping and un-mapping function maps to a new area in memory. If the memory is no longer required, the mapping and un-mapping function can un-map from the area. The memory manager 108 can direct the application as to, for example, a placement strategy, and replacement strategy, and a read and write policy for the instructions provided by the application 110. The memory manager 108 works with the user space library to provide targets for which to collect data. For example, the user space library 106 can monitor hardware-level instructions for which monitors cache mapping and un-mapping function mapped memory space. The user space library can cease collected data for hardware instructions for memory space was un-mapped. In other words, the user space library only collects data for the instructions that are available for the secure processor 118 to execute. The secure processor 118 can be a processor of a compute instance of the system 102.

The system 102 can further include a timer-based unit 112 that is a part of a kernel manager and can monitor an instruction cache (I-cache) of the secure processor 118 for configuration changes. One APT attack method is to change the instruction cache configuration. Certain APT attacks rely on stealing instructions from an entry point and an exit point of an instruction cache. The timer-based unit 112 can register with a hardware component (e.g., secure processor) which fetches instruction cache configuration items. The timer-based unit 112 can determine the instruction cache configuration at predetermined times (e.g., T0, T1, . . . ) and compare the instruction cache configuration items at the different times. The instruction cache configuration items at one point in time that are different than the instruction cache configuration items at another point in time can contribute to the confidence score as to whether an APT attack is occurring.

The system 102 can further include a dynamic random access memory (DRAM) monitoring unit 114. Hardware instructions, such as assembly-level instructions, are stored in DRAM. This includes any false instructions that have been introduced by an APT attack. The DRAM monitoring unit 114 can monitor the DRAM for known false instructions or APT-based instructions patterns of instructions stored in the DRAM. The false instructions can be identified based on whether an instruction has been provided by a hardware provider. For example, manufacturer A can provide a secure processor and a set of instructions. The DRAM monitoring unit 114 can monitor the DRAM for instructions that were not included in the set of instructions provided by the manufacturer, or some other authorized vendor. The confidence score can be used in conjunction with identified false instructions, if any, to determine whether an indication of an APT attack is a false positive or not.

The system 102 can further include a repaver unit 116 for migrating computing resources (e.g., workloads), wiping memory from an infected processor's fleet, and making requests to perform computing tasks from computing instances infected by an APT attack. A fleet can include each of the compute instances in a network that uses the infected processor. In the instance that an APT attack is indicated, and the indication is not a false positive, the repaver unit 116 can initialize mitigation to prevent the APT attack from spreading to other uninfected compute instances. Repaving can include restoring a state of an instance to a state prior to the security breach.

The system 102 can interact with an application 110. The application 110 can potentially introduce an APT attack within the cloud infrastructure.

Figure 2:
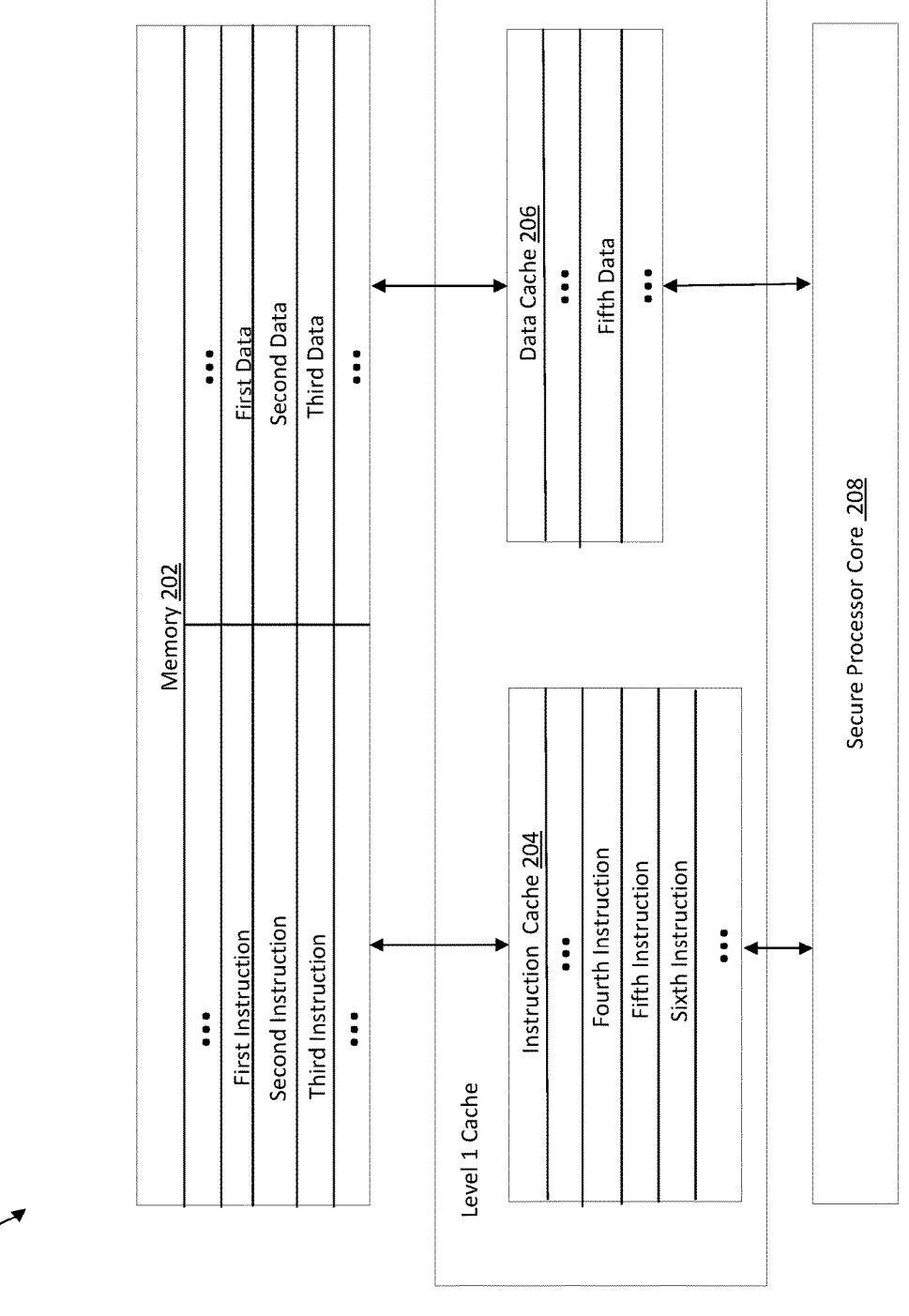
FIG. 2 is an illustration of an instruction cache system, according to one or more embodiments.

FIG. 2 is an illustration 200 of an instruction cache system, according to one or more embodiments. As illustrated, a memory 202 can store and provide instructions to an instruction cache 204 and data to a data cache 206. A secure processor core 208 can receive instructions from the instruction cache 204 and data for use during execution of the instructions from the data cache 206. The secure processor core 208 can execute the instructions and return modified or unmodified data back to the data cache 206, and the data cache 206 can return the modified or unmodified data to the memory 202.

The secure processor core 208 can execute instructions incrementally. The secure processor core 208 can execute an instruction and retrieve the next instruction from the instruction cache 204. As new instructions are required to execute an application, a new instruction can be written into the instruction cache 204 from the memory 202. For example, the instruction cache 204 can include a queue, in which instructions enter from the memory 202 and exit to the secure processor core 208. This can be a continuous process, and therefore the instructions that are currently in the instruction cache 204 can be based on a time that the instruction cache 204 is observed. As described above, each of the instructions in the instructions cache 204 at any given time can belong to a respective instruction class and can be assigned a weight for use by a model (e.g., weighted average model) based on the class. The system can monitor the instructions entering and exiting the instruction cache 204 to analyze patterns and specific instructions to determine whether an APT attack is occurring.

The system can monitor the instruction cache 204 over a configurable window. This includes the instructions that are being read from the memory 202 and written in the instruction cache 204. This also includes the instructions currently stored in the instruction cache 204, and the instructions that are read by the secure processor core 208 for execution. As a state of the instruction cache 204 is a function of time, the herein-described embodiments include configurable time window for observing the instruction cache 204. Therefore, the system can configure a time associated with a window for observation of the instruction cache. For example, if the window is configured to X milliseconds (ms), the system can observe the instruction cache for X ms. If, however, the system configures the window to be Y ms, the system can observe the instruction cache for Y ms. The system can configure the window based on an optimal window to identify whether instructions indicative of an APT attack is being received by the instruction cache 204.

Figure 3:
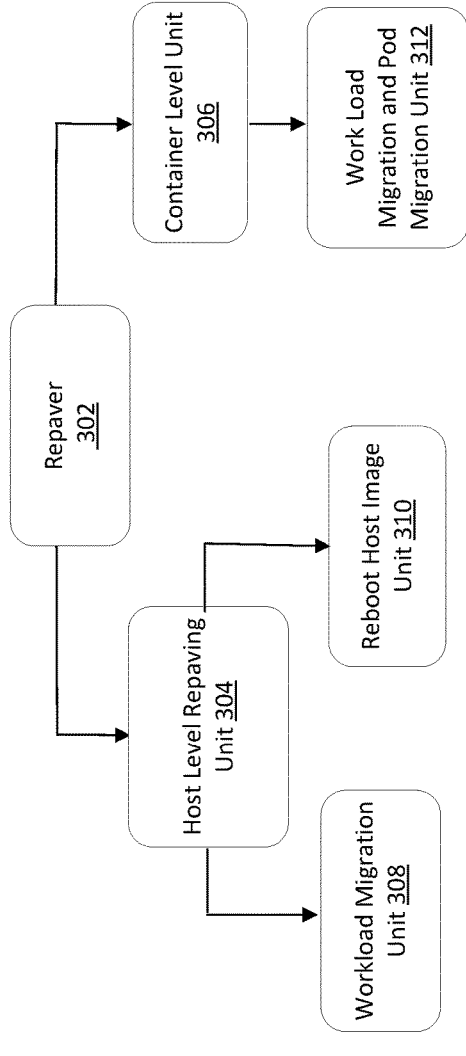
FIG. 3 is an illustration of a repaving system for migrating computing resources, wiping memory, and making requests to perform computing tasks from affected computing instances, according to one or more embodiments.

FIG. 3 is an illustration 300 of a repaving system for migrating computing resources, wiping memory, and making requests to perform computing tasks from affected computing instances, according to one or more embodiments. For example, the repaver 302 can restore a state of workload if ransomware has been introduced to the workload. The repaver 302 can further migrate workloads from an instance affected by ransomware to an unaffected instance. In another example, a workload that is routed for a secure processor, that is determined to be undergoing a computing attack, can be rerouted to another secure processor. The repaver 302 can include a host-level repaving unit 304 for repaving resources at a host-level and a container-level repaving unit 306 for repaving resources at a container level. The host-level repaving unit 304 can include a workload migration unit 308 for repaving workloads from affected computing instances at a host-level. Further, the host-level repaving unit 304 can include a reboot host image unit 310 for repaving a host image for the affected computing instances. The container-level repaving unit 306 can include a workload migration and pod migration module 312 for repaving workloads from the affected computing instances.

Figure 4:
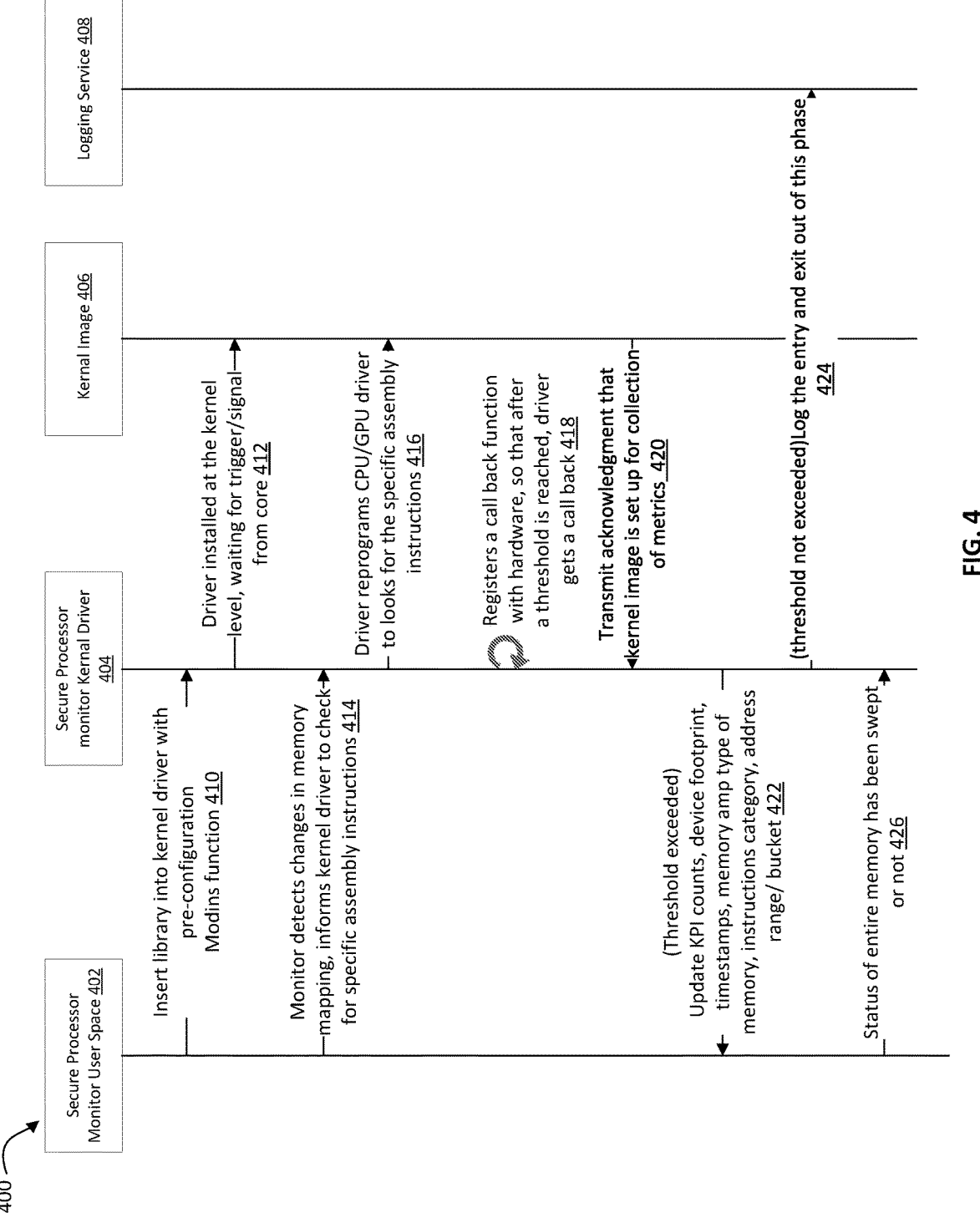
FIG. 4 is a process flow for identifying a computing attack, according to one or more embodiments.

FIG. 4 is a process flow 400 for identifying a computing attack, according to one or more embodiments. As illustrated, a secure processor monitor user space (e.g., user space library) 402, a secure processor monitor kernel driver 404 (e.g., instruction detector), a kernel image 406 (e.g., Linux image), and a logging service 408 can be in operable communication. While the operations of processes 400, 500, 600, 700, 800, and 900 are described as being performed by generic computers, any suitable device (e.g., a cloud service provider server) may be used to perform one or more operations of these processes. Processes 400, 500, 600, 700, 800, and 900 (described below) are respectively illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform functions or implement data types. The order in which the operations are described is not intended to be construed as a limitation, and any number of the described operations can be combined in any order and/or in parallel to implement the processes.

At 410, the secure processor monitor user space 402 can insert one or more kernel level detection instructions into the secure processor monitor kernel driver 404. The secure processor monitor user space 402 can, for example, include a user space library that can retrieve instructions for detecting APT indicative instructions. The secure processor monitor user space 402 can be triggered into retrieving and inserting the detection instructions based on an interaction with an application (e.g., the application 110 of FIG. 1), which may or may not be a vector for an APT attack.

At 412, the secure processor monitor kernel driver 404 can insert the instructions into the kernel image 406. The kernel image 406 can be a binary form of an operating system. In some embodiments, the secure processor monitor kernel driver 404 can insert the instructions into a kernel tree, which can be a source directory or repository that contains a kernel processor core. The secure processor monitor kernel driver 404 can further wait for a trigger or signal from a processor core to begin monitoring. It should be appreciated that steps 410 and 412 can result in the insertion of instructions at a processor core level.

At 414, the secure processor monitor user space 402 can monitor the memory mapping of instructions, such as hardware assembly level instructions (e.g., the instructions entering and exiting an instruction cache). The secure processor monitor user space 402 can further compare the memory mapping of the instructions with historical memory mappings to determine whether the instructions are being mapped to the same memory regions as they have been historically mapped. The secure processor monitor user space 402 can further monitor the assembly instructions for memory map changes. Memory mapping can be a process by which contents of main memory (e.g., the memory 202 of FIG. 2) are brought into a cache, such as the instruction cache 204 of FIG. 2. Memory mapping can also include a process by which a block of main memory is mapped to a cache in case of a cache miss. A change in the memory mapping can be indicative of changing a map from retrieving a legitimate instruction from memory, and retrieving an instruction used for an APT attack.

In the instance that the secure processor monitor user space 402 detects a change to the memory mapping at the cache level, it can transmit a request to the secure processor monitor kernel driver 404 to check for the execution of instructions, whose memory mapping has been changed.

At 416, the secure processor monitor kernel driver 404 can transmit control instructions to configure the kernel image 406 for the collection of metrics to be used for the detection of an APT attack. For example, the secure processor monitor kernel driver 404 can configure a CPU and/or a graphical processing unit (GPU), for the collection of metrics to be used for APT attack detection at the hardware level.

At 418, the secure processor monitor kernel driver 404 can register a call back function with hardware registers to provide a callback to the secure processor monitor user space 402 in the event that one or more of the metrics by the kernel image 406 exceeds a threshold. The call back can be executable code that is passed as an argument into another piece of code. The callback can further transmit a message to the secure processor monitor user space 402 to perform certain post-processing of the collected metrics.

It should be appreciated that the threshold can be based on various parameters, such as whether a non-secure to secure state transition is a single transition during a time interval or multiple transitions during the time interval. For multiple transitions, the number of transitions can vary based on a secure processor manufacturer. For example, an AMD processor can have one threshold number of transitions during the time interval, whereas an Intel processor can have a different threshold number of transitions during the time interval. The difference in thresholds can be based on the specification of each secure processor.

A threshold can also be based on whether there is a single compute instance or multiple compute instances. For example, a network can include multiple compute instances, in which the secure processors are undergoing non-secure to secure state transitions over the time interval. The number of transitions at any one compute instance may be below the threshold given to a single compute instance. However, an indication that all the compute instances in the network are undergoing multiple non-secure to state transitions may be indicative of an APT attack. Even though individually, no one compute instance exceeds a threshold number of transitions for a single compute instance, a threshold can be indicated for a collective number of transitions for multiple compute instances. This threshold can be based on the number of compute instances. For example, if the threshold for a single computer instance is 100 transitions over the time interval, the threshold for multiple compute instances can be 50 transitions per compute instance over the time interval.

A network can include multiple compute instances, and the system can be configured to monitor a sample of the compute instances. The system can further be configured to monitor particular compute instances based on types of secure processors used in a compute instance.

A threshold can also be based on a number of failed transitions from non-secure to secure states. The kernel image 406 can monitor each attempt to transition from a non-secure state to a secure state and a threshold can be provided for a number of failed transition attempts from a non-secure state to a secure state.

The herein-described the system monitors for metrics indicative of an APT attack over time intervals (e.g., ten second intervals). The system can make multiple determinations as to an indication of an APT attack throughout the time interval. For example, if the time interval is ten seconds, a different determination can be made ten times, once for each second of the ten seconds. To account for any outlier determinations, the system can calculate a weighted average of each determination during the time interval (e.g., time window). For each transition that is identified during the time interval, an exponential mathematical equation can be applied. This can result in a cumulative sum of floating-point numbers being compared against a threshold. The cumulative sum can further negate an outlier determinations that would adversely impact a determination as to whether an APT attack is occurring.

At 420, the kernel image 406 can transmit an acknowledgment that the kernel image is set for collection of metrics. For example, the kernel image can establish communication with a processor using an application programming interface for the collection of metrics. Based on the communication, the kernel image 406 can transmit an acknowledgement.

The kernel image 406 can return metrics to the secure processor monitor kernel driver 404. The hardware metrics can be continuously received by the secure processor monitor kernel driver 404 and from the kernel image 406. The secure processor monitor kernel driver 404 can further be configured with one or more metric thresholds. Each of the threshold values can be related to a key performance indicator (KPI). For example, a threshold can be the number of times that an instruction is executed. For some instructions that are overwhelmingly indicative of an APT attack, the number of times can even include one time. The secure processor monitor kernel driver 404 can continuously compare the metrics to one or more threshold values. The secure processor monitor kernel driver 404 can perform the comparison to identify one or more instructions that are indicative of an APT attack.

At 422, if the threshold has been exceeded, the secure processor monitor kernel driver 404 can transmit a notification to the secure processor monitor user space 402 that a metric related to an instruction has exceeded a threshold. The notification can be included in the above-referenced callback of step 418. In response to receiving the notification, the secure processor monitor user space 402 can begin post-processing the incident. For example, the secure processor monitor user space 402 can begin updating cryptographic KPI counts, updating hardware device footprints, identifying which memory maps are updated, identify any generated artifacts. The secure processor monitor user space 402 can further timestamp the collected metrics and store the metrics in memory.

At 424, if the threshold has not been exceeded, the secure processor monitor kernel driver 404 can transmit a notification to the logging service 408, that a metric has not exceeded a threshold. It should be appreciated that the system does not determine whether an APT attack has occurred or is occurring based only on the threshold being exceeded. Rather the system can initialize a model (e.g., weighted average model, mean/mode advanced statistical model) based on the threshold being exceeded. The system can use the model to determine whether an APT has occurred or is occurring.

The model can use mathematical formulas and/or statistical formulas that use weights for each instruction category. A weight corresponding to a particular instruction category is set to reflect a probability that an execution of an instruction of the particular instruction category is indicative of an APT attack. The output of the mathematical formulas and/or statistical formulas can be used to indirectly determine whether an APT attack is occurring or has occurred. Consider the Table 1 below:

TABLE 1

| Instruction Category | Description | Weight of each |
|---|---|---|
| SG | Perform one round of a non-secure to secure state encryption flow | 0.5 |
| BXNS | Branching with non-secure | 0.25 |
| BLXNS | Branching with link and exchange to non-secure state | 0.25 |

Table 1 describes three instruction categories and a weight for each instruction that can be classified as one of the three categories. As seen, the weights differ from category to category. These weights can be determined based on empirical evidence of an indication of an APT attack for example, the SG category of instructions can have a highest weight based on the instruction being related to encryption and being related to transitioning from a non-secure state to a secure state. On the other hand, the BXNS and BXLNS instruction categories relate to instructions for a non-secure state, the categories have a lesser weight. The model can calculate a total weight of the instructions at a given point in time or a given interval in time. The model can multiply a frequency of each instruction with a category weight of the instruction. The model can then determine a sum of all of the determined products. For example, if there are ten instructions of the SG category, the model can perform a multiplication can reach a category value of five (e.g., 10×0.5=5). If there are ten instructions of the BXNS category, the model can reach a category value of two and a half (e.g., 10×0.25=2.5). The model can then sum the values together to reach a total weight of seven and a half (e.g., 5+2.5=7.5). The total weight can represent a cumulative value of transitions between a second state and a non-secure state. The total weight can be compared to a threshold to determine whether there has been or is an APT attack.

The secure processor monitor kernel driver 404 can further indicate that the secure processor monitor user space 402 was triggered to perform post-processing of collected metrics. In other instances, the secure processor monitor kernel driver 404 can transmit a notification of a failure to the logging service 408. This notification can suggest that the secure processor monitor user space 402 transmitted a request to check specific assembly instructions, the instruction detector began to collect metrics, but that no threshold was exceeded.

At 426, the secure processor monitor user space 402 can transmit a notification to the secure processor monitor kernel driver 404 as to whether the memory was swept. As illustrated in FIG. 3, the system can permit repaving an instance compromised by an APT attack. The repaving can include returning an instance from a compromised state to a prior state. For example, a repaver can reload an image of the instance, where the reloaded image is at a state prior to the APT attack. The status can be that the instance has not been repaved, is in the process of repaving, or has been repaved.

Figure 5:
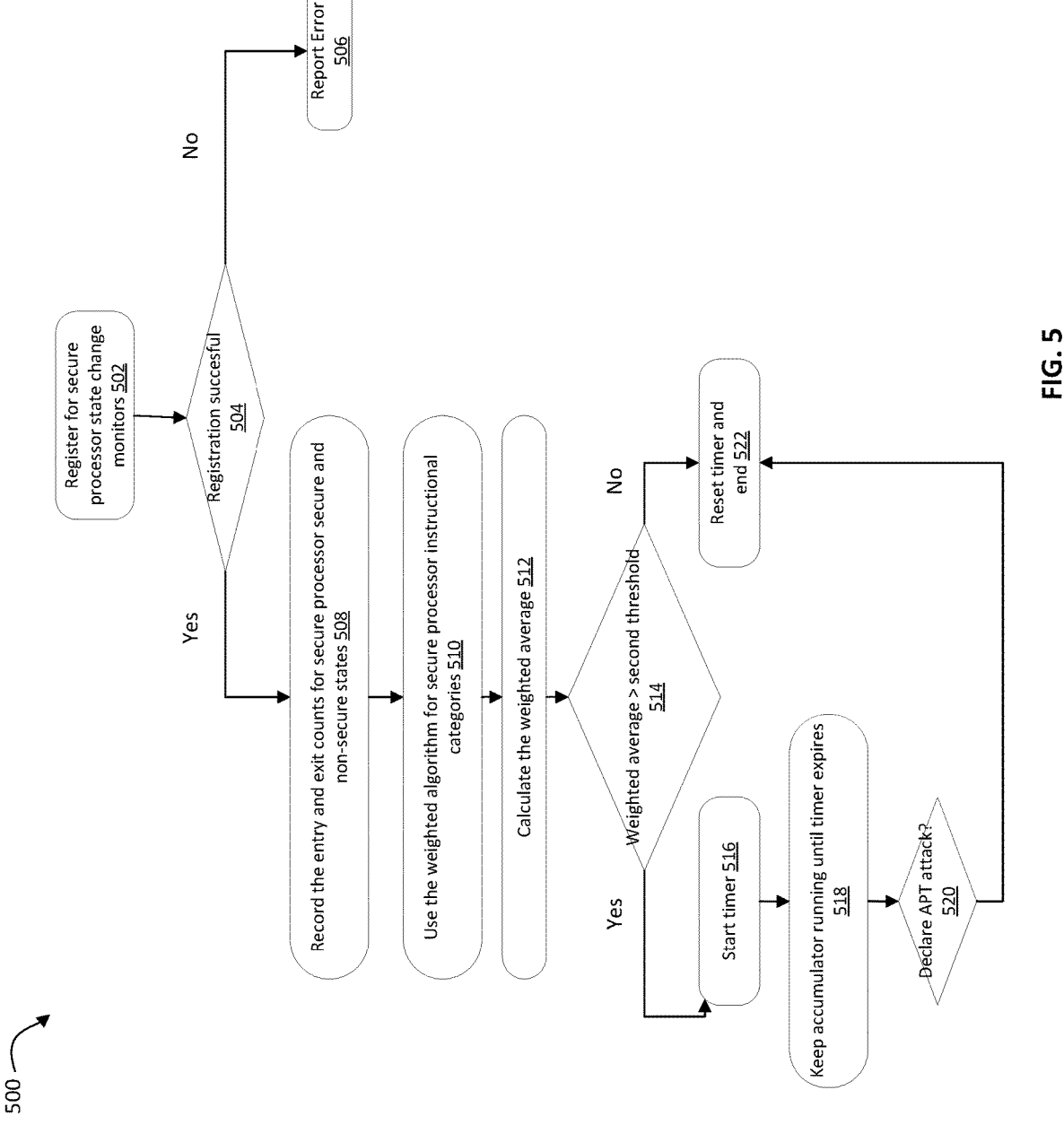
FIG. 5 is a process flow for identifying a computing attack, according to one or more embodiments.

FIG. 5 is a process flow 500 for identifying a computing attack, according to one or more embodiments. At 502, a system can register a hardware component (e.g., secure processor) for non-secure and secure state changes.

At 504, the system can determine whether the registration was successful. If the registration was not successful, the process can move to step 506 and report an error.

If the registration is successful, the process can move to step 508. At step 508, the system can record entry and exit counts for instructions during a secure processors non-secure state and secure states. For example, a kernel image can receive instructions from a secure processor kernel driver to monitor for specific instructions entering and exiting an I-cache of a secure processor.

At 510 the system can use a weighted algorithm to calculate category weights for each category of instructions entering and exiting the I-cache. For example, the kernel image can have collected metrics related to the instructions entering and exiting the I-cache. The metrics can further have exceeded one or more thresholds, including a first threshold. Based on exceeding the first threshold, the kernel image can notify the secure processor kernel driver. The secure processor kernel driver can initialize a model for determining a total weight of the instructions that entered and exited the I-cache during a time interval.

At 512, the system can determine a weighted average of all of the instructions. In some embodiments, the weighted average can be the total weight, as described above. In other instances, the weighted average is an average of the total weight over different points in time. For example, the system can further use the model to determine the weighted average of the instructions.

At 514, the system can determine whether the weighted average is greater than or less than a second threshold.

If the weighted average is greater than the second threshold, the system can move to step 516 to determine whether the weighted average is reflective of a transient non-secure to secure state changes or reflective of a sustained state changes. A system that is under a non-APT attack can exhibit greater than normal state changes between non-secure and secure states. Furthermore, an anti-virus software can induce greater than normal state changes, but this is not expected to be sustained for a non-APT attack.

At 516, the system can start a timer for monitoring the average total weight. At 518, the system can keep an accumulator running until the timer expires. In other words, the system can continue to monitor state changes and calculate the category weights and total weights to calculate a current weighted average. If the state changes are the result of an anti-virus software, the number of state changes can be expected to reduce over time, thereby moving the weighted average below the second threshold. This can be an example of a false positive for an APT attack. If, however, there is an APT attack, the state changes can be expected to continue throughout the timer time period. Therefore, the weighted average is expected to stay greater than the second threshold.

At 520, the system can determine whether to declare an APT attack based on whether the weighted average stayed greater than the second threshold at the expiration of the timer. The system can either declare an APT attack or declare no APT attack. Regardless of whether the system declared an APT attack or not, the system can reset the time and end the process at 522.

Figure 6:
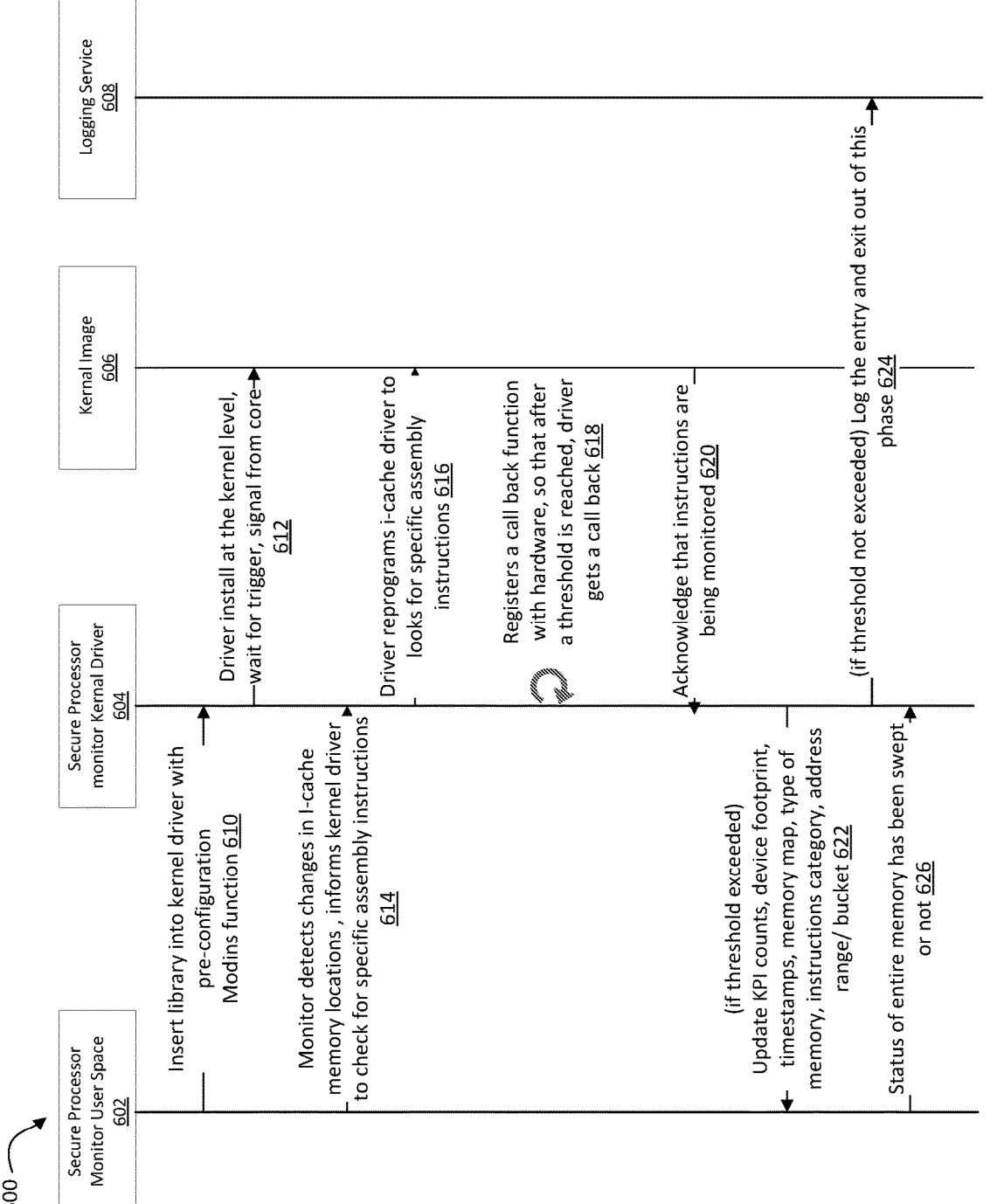
FIG. 6 is a process flow for identifying a computing attack, according to one or more embodiments.

FIG. 6 is a process flow 600 for identifying a computing attack, according to one or more embodiments. At 610, the secure processor monitor user space 602 can insert a kernel level detection instructions into the secure processor monitor kernel driver 604. The secure processor monitor user space 602 can, for example, include a user space library that can retrieve instructions for detecting APT indicative instructions. The secure processor monitor user space 602 can be triggered into retrieving and inserting the detection instructions based on an interaction with an application (e.g., the application 110 of FIG. 1), which may or may not be a vector for an APT attack.

At 612, the secure processor monitor kernel driver 604 can insert the instructions into the kernel image 606. In some embodiments, the secure processor monitor kernel driver 604 can insert the instructions into a kernel tree, which can be a source directory or repository that contains a kernel processor core. The secure processor monitor kernel driver 604 can further wait for a trigger or signal from a processor core to begin monitoring. It should be appreciated that steps 610 and 612 can result in the insertion of instructions at a processor core level.

At 614, the secure processor monitor user space 602 can monitor the memory mapping of instructions, such as hardware assembly level instructions (e.g., the instructions entering and exiting an instruction cache). The secure processor monitor user space 602 can further compare the memory mapping of the instructions with historical memory mappings to determine whether the instructions are being mapped to the same memory regions as they have been historically mapped. The user space library 314 can further monitor the assembly instructions for memory map changes. Memory mapping can be a process by which contents of main memory (e.g., the memory 202 of FIG. 2) are brought into a cache, such as the instruction cache 204 of FIG. 2. Memory mapping can also include a process by which a block of main memory is mapped to cache in case of a cache miss. A change in the memory mapping can be indicative of changing a map from retrieving a legitimate instruction from memory, and retrieving an instruction used for an APT attack.

In the instance that the secure processor monitor user space 602 detects a change to the memory mapping at the cache level, it can transmit a request to the secure processor monitor kernel driver 604 to check for the execution of instructions, whose memory mapping has been changed.

At 616, the secure processor monitor kernel driver 604 can transmit control instructions to configure the kernel image 606 for the collection of metrics to be used for the detection of an APT attack. For example, the secure processor monitor kernel driver 604 can configure a CPU and/or a graphical processing unit (GPU), and instruction cache driver for collection of metrics to be used for APT attack detection at the hardware level. The instruction cache driver can record the entities that are writing to the instruction cache. Typically, only signatories of the kernel image can write to the instruction cache. Therefore, if an entity that is not a signatory of the kernel image is writing instructions to the instruction cache, there is an indication that an APT attack may be occurring. In another example, typically, instruction cache instructions can be pre-loaded onto the instruction cache prior to execution (e.g., around to two to three second prior to execution of the instructions). Whereas during an APT attack, the instructions are pre-loaded within a shorter time interval. The instruction cache driver can record time stamp for a pre-load time and an execution time. The kernel image 606 can determine whether the time interval between pre-loading and execution is less than an expected time. If the interval is less than the expected time, the kernel image 606 can provide this metric that an APT attack may be occurring.

It should be appreciated that in process 400 above, the kernel image retrieved information using a processor API provided by the processor manufacturer, which is a direct method of monitoring the hardware (e.g., secure processor). Process flow 600 is an indirect method of monitoring the instructions entering and exiting the instruction cache using an instruction cache driver.

At 618, the secure processor monitor kernel driver 604 can register a call back function with hardware registers for memory mapped input/output space to provide a callback to the secure processor monitor user space 602 in the event that one or more of the metrics by the kernel image 606 exceeds a threshold. Registers typically refresh at a higher frequency than the instruction cache and each processor architecture can include a set of hardware registers (e.g., registers 1-32). The registers can be monitored to determine over time intervals to determine which specific register was modified during a current time interval that was not modified during a previous time interval. The identity of the modified register(s) can be indicative of an APT attack. This monitoring of registers is in addition to communicating and gathering information from the instruction cache driver. The call back can be executable code that is passed as an argument into another piece of code. The callback can further transmit a message to the secure processor monitor user space 602 to perform certain post-processing of the collected metrics.

At 620, the kernel image 606 can transmit an acknowledgment that the kernel image is set for collection of metrics. For example, the kernel image can establish communication with an instruction cache driver for the collection of metrics. Based on the communication, the kernel image 606 can transmit an acknowledgement.

The kernel image 606 can return metrics to the secure processor monitor kernel driver 604. The hardware metrics can be continuously received by the secure processor monitor kernel driver 604 and from the kernel image 606. The secure processor monitor kernel driver 604 can further be configured with one or more metric thresholds. Each of the threshold values can be related to a key performance indicator (KPI). For example, a threshold can be the number of times that an instruction is executed. For some instructions that are overwhelmingly indicative of an APT attack, the number of times can even include one time. The kernel image 606 can be a binary form of an operating system. The secure processor monitor kernel driver 604 can continuously compare the metrics to one or more threshold values. The secure processor monitor kernel driver 604 can perform the comparison to identify one or more instructions that are indicative of an APT attack.

At 622, the secure processor monitor kernel driver 604 can transmit a notification to the secure processor monitor user space 602 that a metric related to an instruction has exceeded a threshold. The notification can be included in the above-referenced callback of step 618. In response to receiving the notification, the secure processor monitor user space 602 can begin post-processing the incident. For example, the secure processor monitor user space 602 can begin updating cryptographic KPI counts, updating hardware device footprints, identifying which memory maps are updated, identify any generated artifacts. The secure processor monitor user space 602 can further timestamp the collected metrics and store the metrics in memory.

At 624, the secure processor monitor kernel driver 604 can transmit a notification to the logging service 608, that a metric has not exceeded a threshold. It should be appreciated that the system does not determine an APT attack has occurred or is occurring based only on the threshold being exceeded. Rather the system can initialize a model (e.g., weighted average model, mean/mode advanced statistical model) based on the threshold being exceeded. The system can use the model to determine whether an APT has occurred or is occurring.

The model can use mathematical formulas and or statistical formulas that use weights that reflect a probability of switching being secure and non-secure states at a processor level. This probability can be used to indirectly determine whether an APT attack is occurring or has occurred. Consider the Table 1 below:

TABLE 1

| Instruction Category | Description | Weight of each |
|---|---|---|
| SG | Perform one round of a non-secure to secure state encryption flow | 0.5 |
| BXNS | Branching with non-secure | 0.25 |
| BLXNS | Branching with link and exchange to non-secure state | 0.25 |

Table 1 describes three instruction categories and a weight for each instruction that can be classified as one of the three categories. As seen, the weights differ from category to category. These weights can be determined based on empirical evidence of an indication of an APT attack for example, the SG category of instructions can have a highest weight based on the instruction being related to encryption and being related to transitioning from a non-secure state to a secure state. On the other hand, the BXNS and BXLNS instruction categories relate to instructions for a non-secure state, the categories have a lesser weight. The model can calculate a total weight of the instructions at a given point in time or a given interval in time. The model can determine multiple each a frequency of each instruction with a category weight of the instruction. The model can then determine a sum of all of the determined products. For example, if there are ten instructions of the SG category, the model can perform a multiplication can reach a category value of five (e.g., 10×0.5=5). If there are ten instructions of the BXNS category, the model can reach a category value of two and a half (e.g., 10×0.25=2.5). The model can then sum the values together to reach a total weight of seven and a half (e.g., 5+2.5=7.5). The total weight can represent a cumulative value of transitions between a second state and a non-secure state. The total weight can be compared to a threshold to determine whether there has been or is an APT attack.

The secure processor monitor kernel driver 604 can further indicate that the secure processor monitor user space 602 was triggered to perform post-processing of collected metrics. In other instances, the secure processor monitor kernel driver 604 can transmit a notification of a failure to the logging service 608. This notification can suggest that the secure processor monitor user space 602 transmitted a request to check specific assembly instructions, the instruction detector began to collect metrics, but that no threshold was exceeded.

At 626, the secure processor monitor user space 602 can transmit a notification to the secure processor monitor kernel driver 604 as to whether the memory was wiped. As illustrated in FIG. 3, the system can permit repaving an instance compromised by an APT attack. The repaving can include returning an instance from a compromised state to a prior state. For example, a repaver can reload an image of the instance, where the reloaded image is at a state prior to the APT attack. The status can be that the instance has not been repaved, is in the process of repaving, or has been repaved.

Figure 7:
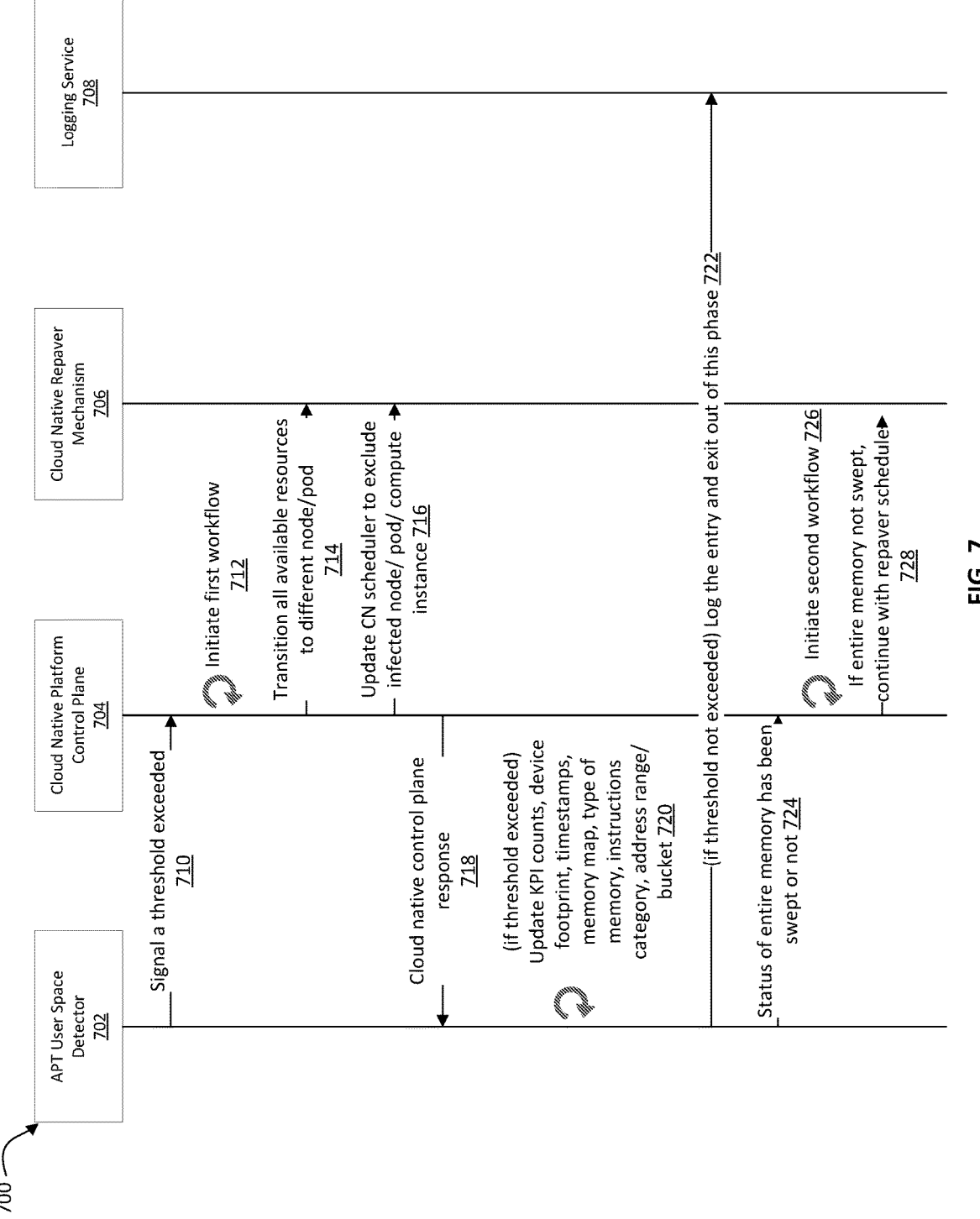
FIG. 7 is a process flow for mitigating a computing attack, according to one or more embodiments.

FIG. 7 is a process flow 700 for mitigating an APT attack, according to one or more embodiments. As illustrated, an APT user space detector 702, a cloud native platform control plane 704, a cloud native repaver mechanism 706, and a logging service 708 can be in operable communication. At 710, the APT user space detector 702 can transmit a signal to the cloud native platform control plane 704, that a threshold has been exceeded. A kernel driver (e.g., the secure processor monitor kernel driver 404 of FIG. 4) can include the APT user space detector 702 and be configured to collect instruction cache-related metrics that can be indicative of an APT attack. The APT threat detector can further compare the metrics to one or more thresholds to determine if a threshold has been exceeded.

At 712, the cloud native platform control plane 704 can initiate a first workflow based at least in part on the transmission that the threshold has been exceeded of step 710.

At 714, the cloud native platform control plane 704 can transition all available workloads to a different node or pod of the cloud infrastructure. For example, the cloud native platform control plane 704 can identify a secure processor that may be a victim of an APT attack. In another example, a workload that is routed for the secure processor can be rerouted to another secure processor. The secure processor can have been executing one or more instructions for an application. The application can be the cause of the APT and therefore, the cloud native platform control plane 704 can divert resources (e.g., virtual machines for processing job requests) away from the application.

At 716, the cloud native platform control plane 704 can update a cloud native scheduler to exclude the infected node, pod or compute instance. In other words, all incoming requests and workflows can be diverted away from infected aspects of a cloud environment.

At 718, the cloud native platform control plane 704 can transmit a response to the APT user space detector 702 as to a determination of an APT attack. For example, the cloud native platform control plane 704 can use the collected metrics to generate inputs for a model (e.g., weighted average model) that can calculate an average total weight based at least in part on the metrics. The model can further compare the average total weight to a threshold to determine whether an APT attack has occurred.

At 720, if an APT attack is determined to have occurred or occurring during a monitored time interval, the APT user space detector 702 can update cryptographic KPI counts, updating hardware device footprints, identifying which memory maps are updated, types of memory, address ranges for false instructions, identify any generated artifacts. The secure processor monitor user space 402 that can further timestamp the collected metrics and store the metrics in memory.

At 722, if an APT has been determined to not have occurred during a monitored time interval, the APT user space detector 702 can transmit a notification to the logging service 708, that a metric has not exceeded a threshold.

At 724, the APT user space detector 702 can transmit a notification to the cloud native platform control plane 704 as to whether the memory was swept. As illustrated in FIG. 3, the system can permit repaving an instance compromised by an APT attack. The repaving can include returning an instance from a compromised state to a prior state. For example, a repaver can reload an image of the instance, where the reloaded image is at a state prior to the APT attack. The status can be that the instance has not been repaved, is in the process of repaving, or has been repaved.

FIG. 8 is a process flow 800 for identifying a computing attack, according to one or more embodiments. At 802, the method can include a computing device receiving a message identifying an instruction loaded onto an instruction cache of a secure processer. The computing device can be, for example, a secure processor monitor kernel driver. The message can be received from a secure processor monitor user space (e.g., user space library). The secure processor monitor user space can have detected abnormal activity in the memory mapping from the instructions loaded onto the instruction cache and DRAM. Based on the abnormal activity, the secure processor monitor user space can transmit the message.

At 804, the method can include the computing device transmitting a control instruction to configure a kernel image to collect a first metric over a first time interval, the first metric being generated based at least in part on the secure processor executing the instruction during the first time interval. The first metric can include, for example, a number of times that the secure processor executed the instruction during the first time interval.

At 806, the method can include the computing device receiving the first metric from the kernel image, the first metric being indicative of a transition of the secure processor from a non-secure state to a secure state. For example, the kernel image can transmit the number of times that the secure processor executed the instruction during the first time interval to the secure processor monitor kernel driver.

At 808, the method can include the computing device determining whether the secure processor is undergoing a computing attack based at least in part on the first metric. The computing device can use a model, such as a weighted average model to calculate a value that is indicative of a number of times that the secure processor transitioned from a non-secure state to a secure state. The computing device can use the model to compare the value to a threshold value. Based on the comparison, the computing device can determine whether a transient APT attack has occurred, or a sustained transient attack has occurred.

At 810, the method can include the computing device transmitting the determination of whether the secure processor is undergoing the computing attack. For example, the determination can be transmitted to a sender of the message. Based on receiving the message, the user space library can mitigate the effects of the APT attack by repaving any infected elements.

FIG. 9 is a process flow 900 for mitigating an APT attack, according to one or more embodiments. At 902, the method can include a computing device receiving, by a computing device, a first message that a metric collected from a first secure processor has exceeded a threshold, the metric exceeding the threshold being indicative of a computing attack, the first secure processor being an element of a first node of a network, and the first node comprising a compute instance. The computing device can be, for example, a control plane of a cloud computing network. The message can be received from an APT user space detector.

At 904, the method can include a computing device transmitting a first control instruction over the network to transition a second secure processor from the first node to a second node of the network based at least in part on the first message. The computing device can isolate an infected node or pod by diverting resources away from the infected node or pod.

At 906, the method can include a computing device transmitting a second control instruction over the network to suspend the first node from receiving a workflow request. The computing device can further mitigate any damage by preventing future requests from being transmitted to the infected node for processing.

At 908, the method can include a computing device determining whether the first secure processor is undergoing a computing attack (e.g., an advanced persistent threat attack) based at least in part on the metric. The computing device can use a model, such as a weighted average model to calculate a value that is indicative of a number of times that the secure processor transitioned from a non-secure state to a secure state. The computing device can use the model to compare the value to a threshold value. Based on the comparison, the computing device can determine computing attack type (e.g., whether a transient APT attack has occurred, or a sustained transient attack has occurred).

At 910, the method can include a computing device transmitting the determination of whether the first secure processor is undergoing the computing attack. For example, the message can be transmitted to a sender of the first message.

At 912, the method can include a computing device receiving, by the computing device, a second message that the computing attack has been mitigated with respect to the first node. For example, the message can be received by a sender of the first message. Based on determining that the computing attack has been mitigated, the computing device can transmit new control instructions to the network to allow the first node to utilize network resources and receive incoming workflow requests As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 10:
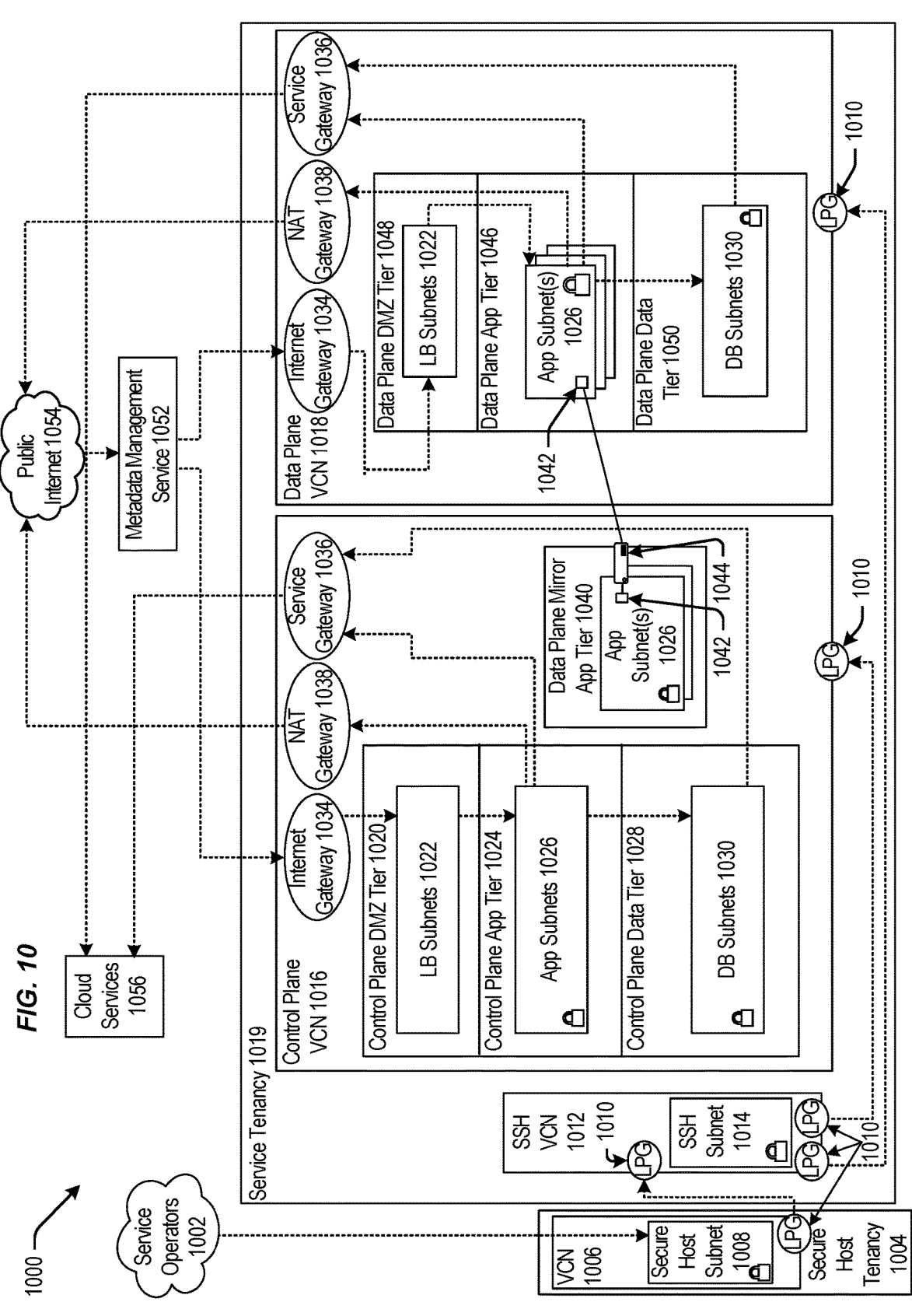
FIG. 10 is a block diagram illustrating one pattern for implementing a cloud infrastructure as a service system, according to at least one embodiment.

FIG. 10 is a block diagram 1000 illustrating an example pattern of an IaaS architecture, according to at least one embodiment. Service operators 1002 can be communicatively coupled to a secure host tenancy 1004 that can include a virtual cloud network (VCN) 1006 and a secure host subnet 1008. In some examples, the service operators 1002 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1006 and/or the Internet.

The VCN 1006 can include a local peering gateway (LPG) 1010 that can be communicatively coupled to a secure shell (SSH) VCN 1012 via an LPG 1010 contained in the SSH VCN 1012. The SSH VCN 1012 can include an SSH subnet 1014, and the SSH VCN 1012 can be communicatively coupled to a control plane VCN 1016 via the LPG 1010 contained in the control plane VCN 1016. Also, the SSH VCN 1012 can be communicatively coupled to a data plane VCN 1018 via an LPG 1010. The control plane VCN 1016 and the data plane VCN 1018 can be contained in a service tenancy 1019 that can be owned and/or operated by the IaaS provider.

The control plane VCN 1016 can include a control plane demilitarized zone (DMZ) tier 1020 that acts as a perimeter network (e.g., portions of a corporate network between the corporate intranet and external networks). The DMZ-based servers may have restricted responsibilities and help keep breaches contained. Additionally, the DMZ tier 1020 can include one or more load balancer (LB) subnet(s) 1022, a control plane app tier 1024 that can include app subnet(s) 1026, a control plane data tier 1028 that can include database (DB) subnet(s) 1030 (e.g., frontend DB subnet(s) and/or backend DB subnet(s)). The LB subnet(s) 1022 contained in the control plane DMZ tier 1020 can be communicatively coupled to the app subnet(s) 1026 contained in the control plane app tier 1024 and an Internet gateway 1034 that can be contained in the control plane VCN 1016, and the app subnet(s) 1026 can be communicatively coupled to the DB subnet(s) 1030 contained in the control plane data tier 1028 and a service gateway 1036 and a network address translation (NAT) gateway 1038. The control plane VCN 1016 can include the service gateway 1036 and the NAT gateway 1038.

The control plane VCN 1016 can include a data plane mirror app tier 1040 that can include app subnet(s) 1026. The app subnet(s) 1026 contained in the data plane mirror app tier 1040 can include a virtual network interface controller (VNIC) 1042 that can execute a compute instance 1044. The compute instance 1044 can communicatively couple the app subnet(s) 1026 of the data plane mirror app tier 1040 to app subnet(s) 1026 that can be contained in a data plane app tier 1046.

The data plane VCN 1018 can include the data plane app tier 1046, a data plane DMZ tier 1048, and a data plane data tier 1050. The data plane DMZ tier 1048 can include LB subnet(s) 1022 that can be communicatively coupled to the app subnet(s) 1026 of the data plane app tier 1046 and the Internet gateway 1034 of the data plane VCN 1018. The app subnet(s) 1026 can be communicatively coupled to the service gateway 1036 of the data plane VCN 1018 and the NAT gateway 1038 of the data plane VCN 1018. The data plane data tier 1050 can also include the DB subnet(s) 1030 that can be communicatively coupled to the app subnet(s) 1026 of the data plane app tier 1046.

The Internet gateway 1034 of the control plane VCN 1016 and of the data plane VCN 1018 can be communicatively coupled to a metadata management service 1052 that can be communicatively coupled to public Internet 1054. Public Internet 1054 can be communicatively coupled to the NAT gateway 1038 of the control plane VCN 1016 and of the data plane VCN 1018. The service gateway 1036 of the control plane VCN 1016 and of the data plane VCN 1018 can be communicatively couple to cloud services 1056.

In some examples, the service gateway 1036 of the control plane VCN 1016 or of the data plane VCN 1018 can make application programming interface (API) calls to cloud services 1056 without going through public Internet 1054. The API calls to cloud services 1056 from the service gateway 1036 can be one-way: the service gateway 1036 can make API calls to cloud services 1056, and cloud services 1056 can send requested data to the service gateway 1036. But, cloud services 1056 may not initiate API calls to the service gateway 1036.

In some examples, the secure host tenancy 1004 can be directly connected to the service tenancy 1019, which may be otherwise isolated. The secure host subnet 1008 can communicate with the SSH subnet 1014 through an LPG 1010 that may enable two-way communication over an otherwise isolated system. Connecting the secure host subnet 1008 to the SSH subnet 1014 may give the secure host subnet 1008 access to other entities within the service tenancy 1019.

The control plane VCN 1016 may allow users of the service tenancy 1019 to set up or otherwise provision desired resources. Desired resources provisioned in the control plane VCN 1016 may be deployed or otherwise used in the data plane VCN 1018. In some examples, the control plane VCN 1016 can be isolated from the data plane VCN 1018, and the data plane mirror app tier 1040 of the control plane VCN 1016 can communicate with the data plane app tier 1046 of the data plane VCN 1018 via VNICs 1042 that can be contained in the data plane mirror app tier 1040 and the data plane app tier 1046.

In some examples, users of the system, or customers, can make requests, for example create, read, update, or delete (CRUD) operations, through public Internet 1054 that can communicate the requests to the metadata management service 1052. The metadata management service 1052 can communicate the request to the control plane VCN 1016 through the Internet gateway 1034. The request can be received by the LB subnet(s) 1022 contained in the control plane DMZ tier 1020. The LB subnet(s) 1022 may determine that the request is valid, and in response to this determination, the LB subnet(s) 1022 can transmit the request to app subnet(s) 1026 contained in the control plane app tier 1024. If the request is validated and requires a call to public Internet 1054, the call to public Internet 1054 may be transmitted to the NAT gateway 1038 that can make the call to public Internet 1054. Metadata that may be desired to be stored by the request can be stored in the DB subnet(s) 1030.

In some examples, the data plane mirror app tier 1040 can facilitate direct communication between the control plane VCN 1016 and the data plane VCN 1018. For example, changes, updates, or other suitable modifications to configuration may be desired to be applied to the resources contained in the data plane VCN 1018. Via a VNIC 1042, the control plane VCN 1016 can directly communicate with, and can thereby execute the changes, updates, or other suitable modifications to configuration to, resources contained in the data plane VCN 1018.

In some embodiments, the control plane VCN 1016 and the data plane VCN 1018 can be contained in the service tenancy 1019. In this case, the user, or the customer, of the system may not own or operate either the control plane VCN 1016 or the data plane VCN 1018. Instead, the IaaS provider may own or operate the control plane VCN 1016 and the data plane VCN 1018, both of which may be contained in the service tenancy 1019. This embodiment can enable isolation of networks that may prevent users or customers from interacting with other users', or other customers', resources.

Also, this embodiment may allow users or customers of the system to store databases privately without needing to rely on public Internet 1054, which may not have a desired level of threat prevention, for storage.

In other embodiments, the LB subnet(s) 1022 contained in the control plane VCN 1016 can be configured to receive a signal from the service gateway 1036. In this embodiment, the control plane VCN 1016 and the data plane VCN 1018 may be configured to be called by a customer of the IaaS provider without calling public Internet 1054. Customers of the IaaS provider may desire this embodiment since database(s) that the customers use may be controlled by the IaaS provider and may be stored on the service tenancy 1019, which may be isolated from public Internet 1054.

Figure 11:
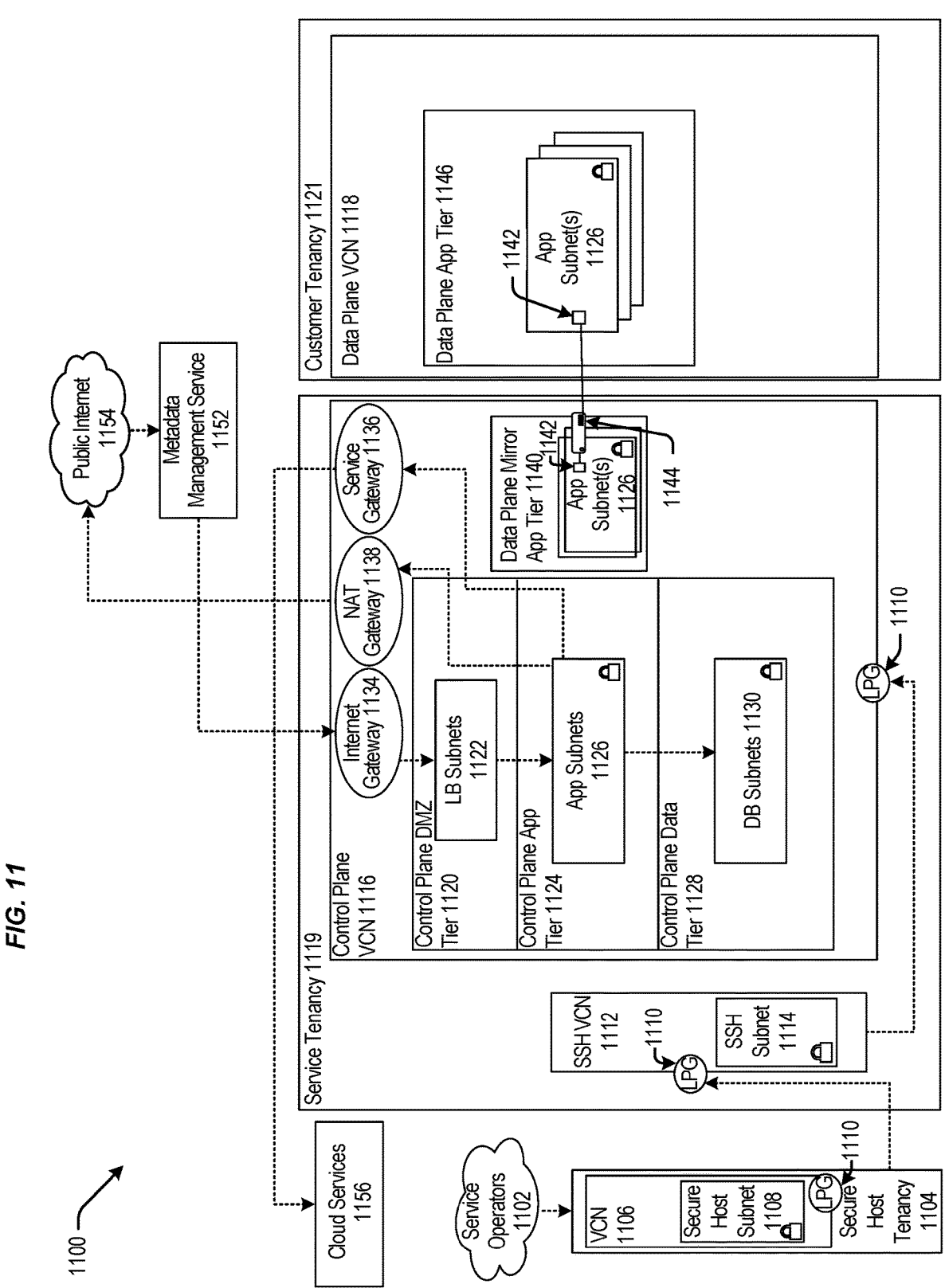
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g., service operators 1002 of FIG. 10) can be communicatively coupled to a secure host tenancy 1104 (e.g., the secure host tenancy 1004 of FIG. 10) that can include a virtual cloud network (VCN) 1106 (e.g., the VCN 1006 of FIG. 10) and a secure host subnet 1108 (e.g., the secure host subnet 1008 of FIG. 10). The VCN 1106 can include a local peering gateway (LPG) 1110 (e.g., the LPG 1010 of FIG. 10) that can be communicatively coupled to a secure shell (SSH) VCN 1112 (e.g., the SSH VCN 1012 of FIG. 10) via an LPG 1010 contained in the SSH VCN 1112. The SSH VCN 1112 can include an SSH subnet 1114 (e.g., the SSH subnet 1014 of FIG. 10), and the SSH VCN 1112 can be communicatively coupled to a control plane VCN 1116 (e.g., the control plane VCN 1016 of FIG. 10) via an LPG 1110 contained in the control plane VCN 1116. The control plane VCN 1116 can be contained in a service tenancy 1119 (e.g., the service tenancy 1019 of FIG. 10), and the data plane VCN 1118 (e.g., the data plane VCN 1018 of FIG. 10) can be contained in a customer tenancy 1121 that may be owned or operated by users, or customers, of the system.

The control plane VCN 1116 can include a control plane DMZ tier 1120 (e.g., the control plane DMZ tier 1020 of FIG. 10) that can include LB subnet(s) 1122 (e.g., LB subnet(s) 1022 of FIG. 10), a control plane app tier 1124 (e.g., the control plane app tier 1024 of FIG. 10) that can include app subnet(s) 1126 (e.g., app subnet(s) 1026 of FIG. 10), a control plane data tier 1128 (e.g., the control plane data tier 1028 of FIG. 10) that can include database (DB) subnet(s) 1130 (e.g., similar to DB subnet(s) 1030 of FIG. 10). The LB subnet(s) 1122 contained in the control plane DMZ tier 1120 can be communicatively coupled to the app subnet(s) 1126 contained in the control plane app tier 1124 and an Internet gateway 1134 (e.g., the Internet gateway 1034 of FIG. 10) that can be contained in the control plane VCN 1116, and the app subnet(s) 1126 can be communicatively coupled to the DB subnet(s) 1130 contained in the control plane data tier 1128 and a service gateway 1136 (e.g., the service gateway 1036 of FIG. 10) and a network address translation (NAT) gateway 1138 (e.g., the NAT gateway 1038 of FIG. 10). The control plane VCN 1116 can include the service gateway 1136 and the NAT gateway 1138.

The control plane VCN 1116 can include a data plane mirror app tier 1140 (e.g., the data plane mirror app tier 1040 of FIG. 10) that can include app subnet(s) 1126. The app subnet(s) 1126 contained in the data plane mirror app tier 1140 can include a virtual network interface controller (VNIC) 1142 (e.g., the VNIC of 1042) that can execute a compute instance 1144 (e.g., similar to the compute instance 1044 of FIG. 10). The compute instance 1144 can facilitate communication between the app subnet(s) 1126 of the data plane mirror app tier 1140 and the app subnet(s) 1126 that can be contained in a data plane app tier 1146 (e.g., the data plane app tier 1046 of FIG. 10) via the VNIC 1142 contained in the data plane mirror app tier 1140 and the VNIC 1142 contained in the data plane app tier 1146.

The Internet gateway 1134 contained in the control plane VCN 1116 can be communicatively coupled to a metadata management service 1152 (e.g., the metadata management service 1052 of FIG. 10) that can be communicatively coupled to public Internet 1154 (e.g., public Internet 1054 of FIG. 10). Public Internet 1154 can be communicatively coupled to the NAT gateway 1138 contained in the control plane VCN 1116. The service gateway 1136 contained in the control plane VCN 1116 can be communicatively couple to cloud services 1156 (e.g., cloud services 1056 of FIG. 10).

In some examples, the data plane VCN 1118 can be contained in the customer tenancy 1121. In this case, the IaaS provider may provide the control plane VCN 1116 for each customer, and the IaaS provider may, for each customer, set up a unique compute instance 1144 that is contained in the service tenancy 1119. Each compute instance 1144 may allow communication between the control plane VCN 1116, contained in the service tenancy 1119, and the data plane VCN 1118 that is contained in the customer tenancy 1121. The compute instance 1144 may allow resources, that are provisioned in the control plane VCN 1116 that is contained in the service tenancy 1119, to be deployed or otherwise used in the data plane VCN 1118 that is contained in the customer tenancy 1121.

In other examples, the customer of the IaaS provider may have databases that live in the customer tenancy 1121. In this example, the control plane VCN 1116 can include the data plane mirror app tier 1140 that can include app subnet(s) 1126. The data plane mirror app tier 1140 can reside in the data plane VCN 1118, but the data plane mirror app tier 1140 may not live in the data plane VCN 1118. That is, the data plane mirror app tier 1140 may have access to the customer tenancy 1121, but the data plane mirror app tier 1140 may not exist in the data plane VCN 1118 or be owned or operated by the customer of the IaaS provider. The data plane mirror app tier 1140 may be configured to make calls to the data plane VCN 1118 but may not be configured to make calls to any entity contained in the control plane VCN 1116. The customer may desire to deploy or otherwise use resources in the data plane VCN 1118 that are provisioned in the control plane VCN 1116, and the data plane mirror app tier 1140 can facilitate the desired deployment, or other usage of resources, of the customer.

In some embodiments, the customer of the IaaS provider can apply filters to the data plane VCN 1118. In this embodiment, the customer can determine what the data plane VCN 1118 can access, and the customer may restrict access to public Internet 1154 from the data plane VCN 1118. The IaaS provider may not be able to apply filters or otherwise control access of the data plane VCN 1118 to any outside networks or databases. Applying filters and controls by the customer onto the data plane VCN 1118, contained in the customer tenancy 1121, can help isolate the data plane VCN 1118 from other customers and from public Internet 1154.

In some embodiments, cloud services 1156 can be called by the service gateway 1136 to access services that may not exist on public Internet 1154, on the control plane VCN 1116, or on the data plane VCN 1118. The connection between cloud services 1156 and the control plane VCN 1116 or the data plane VCN 1118 may not be live or continuous. Cloud services 1156 may exist on a different network owned or operated by the IaaS provider. Cloud services 1156 may be configured to receive calls from the service gateway 1136 and may be configured to not receive calls from public Internet 1154. Some cloud services 1156 may be isolated from other cloud services 1156, and the control plane VCN 1116 may be isolated from cloud services 1156 that may not be in the same region as the control plane VCN 1116. For example, the control plane VCN 1116 may be located in "Region 1," and cloud service "Deployment 10," may be located in Region 1 and in "Region 2." If a call to Deployment 10 is made by the service gateway 1136 contained in the control plane VCN 1116 located in Region 1, the call may be transmitted to Deployment 10 in Region 1. In this example, the control plane VCN 1116, or Deployment 10 in Region 1, may not be communicatively coupled to, or otherwise in communication with, Deployment 10 in Region 2.

Figure 12:
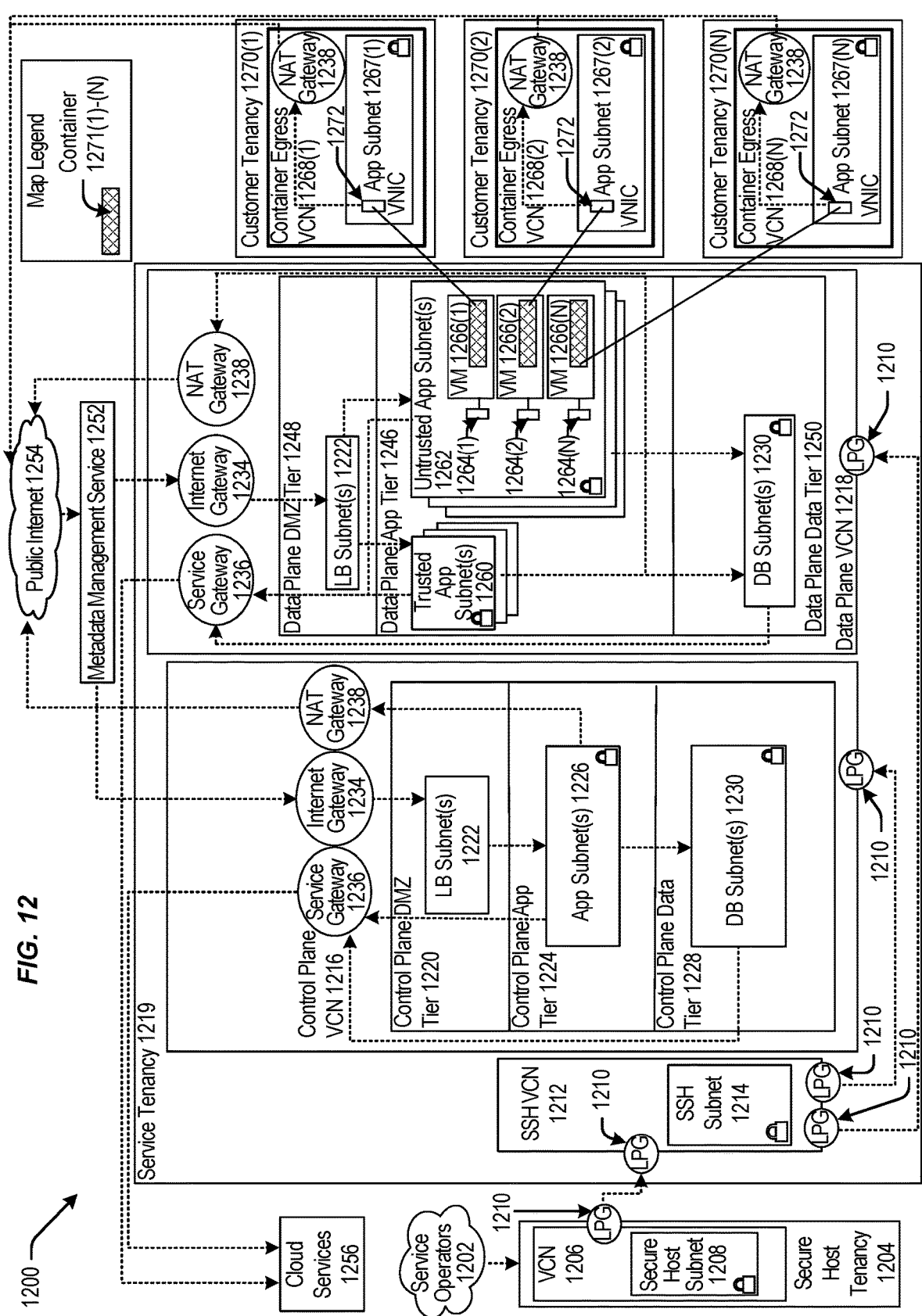
FIG. 12 is a block diagram illustrating another pattern for implementing a cloud infrastructure as a service system, according to at least one embodiment.

FIG. 12 is a block diagram 1200 illustrating another example pattern of an IaaS architecture, according to at least one embodiment. Service operators 1202 (e.g., service operators 1002 of FIG. 10) can be communicatively coupled to a secure host tenancy 1204 (e.g., the secure host tenancy 1004 of FIG. 10) that can include a virtual cloud network (VCN) 1206 (e.g., the VCN 1006 of FIG. 10) and a secure host subnet 1208 (e.g., the secure host subnet 1008 of FIG. 10). The VCN 1206 can include an LPG 1210 (e.g., the LPG 1010 of FIG. 10) that can be communicatively coupled to an SSH VCN 1212 (e.g., the SSH VCN 1012 of FIG. 10) via an LPG 1210 contained in the SSH VCN 1212. The SSH VCN 1212 can include an SSH subnet 1214 (e.g., the SSH subnet 1014 of FIG. 10), and the SSH VCN 1212 can be communicatively coupled to a control plane VCN 1216 (e.g., the control plane VCN 1016 of FIG. 10) via an LPG 1210 contained in the control plane VCN 1216 and to a data plane VCN 1218 (e.g., the data plane 1018 of FIG. 10) via an LPG 1210 contained in the data plane VCN 1218. The control plane VCN 1216 and the data plane VCN 1218 can be contained in a service tenancy 1219 (e.g., the service tenancy 1019 of FIG. 10).

The control plane VCN 1216 can include a control plane DMZ tier 1220 (e.g., the control plane DMZ tier 1020 of FIG. 10) that can include load balancer (LB) subnet(s) 1222 (e.g., LB subnet(s) 1022 of FIG. 10), a control plane app tier 1224 (e.g., the control plane app tier 1024 of FIG. 10) that can include app subnet(s) 1226 (e.g., similar to app subnet(s) 1026 of FIG. 10), a control plane data tier 1228 (e.g., the control plane data tier 1028 of FIG. 10) that can include DB subnet(s) 1230. The LB subnet(s) 1222 contained in the control plane DMZ tier 1220 can be communicatively coupled to the app subnet(s) 1226 contained in the control plane app tier 1224 and to an Internet gateway 1234 (e.g., the Internet gateway 1034 of FIG. 10) that can be contained in the control plane VCN 1216, and the app subnet(s) 1226 can be communicatively coupled to the DB subnet(s) 1230 contained in the control plane data tier 1228 and to a service gateway 1236 (e.g., the service gateway of FIG. 10) and a network address translation (NAT) gateway 1238 (e.g., the NAT gateway 1038 of FIG. 10). The control plane VCN 1216 can include the service gateway 1236 and the NAT gateway 1238.

The data plane VCN 1218 can include a data plane app tier 1246 (e.g., the data plane app tier 1046 of FIG. 10), a data plane DMZ tier 1248 (e.g., the data plane DMZ tier 1048 of FIG. 10), and a data plane data tier 1250 (e.g., the data plane data tier 1050 of FIG. 10). The data plane DMZ tier 1248 can include LB subnet(s) 1222 that can be communicatively coupled to trusted app subnet(s) 1260 and untrusted app subnet(s) 1262 of the data plane app tier 1246 and the Internet gateway 1234 contained in the data plane VCN 1218. The trusted app subnet(s) 1260 can be communicatively coupled to the service gateway 1236 contained in the data plane VCN 1218, the NAT gateway 1238 contained in the data plane VCN 1218, and DB subnet(s) 1230 contained in the data plane data tier 1250. The untrusted app subnet(s) 1262 can be communicatively coupled to the service gateway 1236 contained in the data plane VCN 1218 and DB subnet(s) 1230 contained in the data plane data tier 1250. The data plane data tier 1250 can include DB subnet(s) 1230 that can be communicatively coupled to the service gateway 1236 contained in the data plane VCN 1218.

The untrusted app subnet(s) 1262 can include one or more primary VNICs 1264(1)-(N) that can be communicatively coupled to tenant virtual machines (VMs) 1266(1)-(N). Each tenant VM 1266(1)-(N) can be communicatively coupled to a respective app subnet 1267(1)-(N) that can be contained in respective container egress VCNs 1268(1)-(N) that can be contained in respective customer tenancies 1270(1)-(N). Respective secondary VNICs 1272(1)-(N) can facilitate communication between the untrusted app subnet(s) 1262 contained in the data plane VCN 1218 and the app subnet contained in the container egress VCNs 1268(1)-(N). Each container egress VCNs 1268(1)-(N) can include a NAT gateway 1238 that can be communicatively coupled to public Internet 1254 (e.g., public Internet 1054 of FIG. 10).

The Internet gateway 1234 contained in the control plane VCN 1216 and contained in the data plane VCN 1218 can be communicatively coupled to a metadata management service 1252 (e.g., the metadata management system 1052 of FIG. 10) that can be communicatively coupled to public Internet 1254. Public Internet 1254 can be communicatively coupled to the NAT gateway 1238 contained in the control plane VCN 1216 and contained in the data plane VCN 1218. The service gateway 1236 contained in the control plane VCN 1216 and contained in the data plane VCN 1218 can be communicatively couple to cloud services 1256.

In some embodiments, the data plane VCN 1218 can be integrated with customer tenancies 1270. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1246. Code to run the function may be executed in the VMs 1266(1)-(N), and the code may not be configured to run anywhere else on the data plane VCN 1218. Each VM 1266(1)-(N) may be connected to one customer tenancy 1270. Respective containers 1271(1)-(N) contained in the VMs 1266(1)-(N) may be configured to run the code. In this case, there can be a dual isolation (e.g., the containers 1271(1)-(N) running code, where the containers 1271(1)-(N) may be contained in at least the VM 1266(1)-(N) that are contained in the untrusted app subnet(s) 1262), which may help prevent incorrect or otherwise undesirable code from damaging the network of the IaaS provider or from damaging a network of a different customer. The containers 1271 (1)-(N) may be communicatively coupled to the customer tenancy 1270 and may be configured to transmit or receive data from the customer tenancy 1270. The containers 1271 (1)-(N) may not be configured to transmit or receive data from any other entity in the data plane VCN 1218. Upon completion of running the code, the IaaS provider may kill or otherwise dispose of the containers 1271(1)-(N).

In some embodiments, the trusted app subnet(s) 1260 may run code that may be owned or operated by the IaaS provider. In this embodiment, the trusted app subnet(s) 1260 may be communicatively coupled to the DB subnet(s) 1230 and be configured to execute CRUD operations in the DB subnet(s) 1230. The untrusted app subnet(s) 1262 may be communicatively coupled to the DB subnet(s) 1230, but in this embodiment, the untrusted app subnet(s) may be configured to execute read operations in the DB subnet(s) 1230. The containers 1271(1)-(N) that can be contained in the VM 1266(1)-(N) of each customer and that may run code from the customer may not be communicatively coupled with the DB subnet(s) 1230.

In other embodiments, the control plane VCN 1216 and the data plane VCN 1218 may not be directly communicatively coupled. In this embodiment, there may be no direct communication between the control plane VCN 1216 and the data plane VCN 1218. However, communication can occur indirectly through at least one method. An LPG 1210 may be established by the IaaS provider that can facilitate communication between the control plane VCN 1216 and the data plane VCN 1218. In another example, the control plane VCN 1216 or the data plane VCN 1218 can make a call to cloud services 1256 via the service gateway 1236. For example, a call to cloud services 1256 from the control plane VCN 1216 can include a request for a service that can communicate with the data plane VCN 1218.

Figure 13:
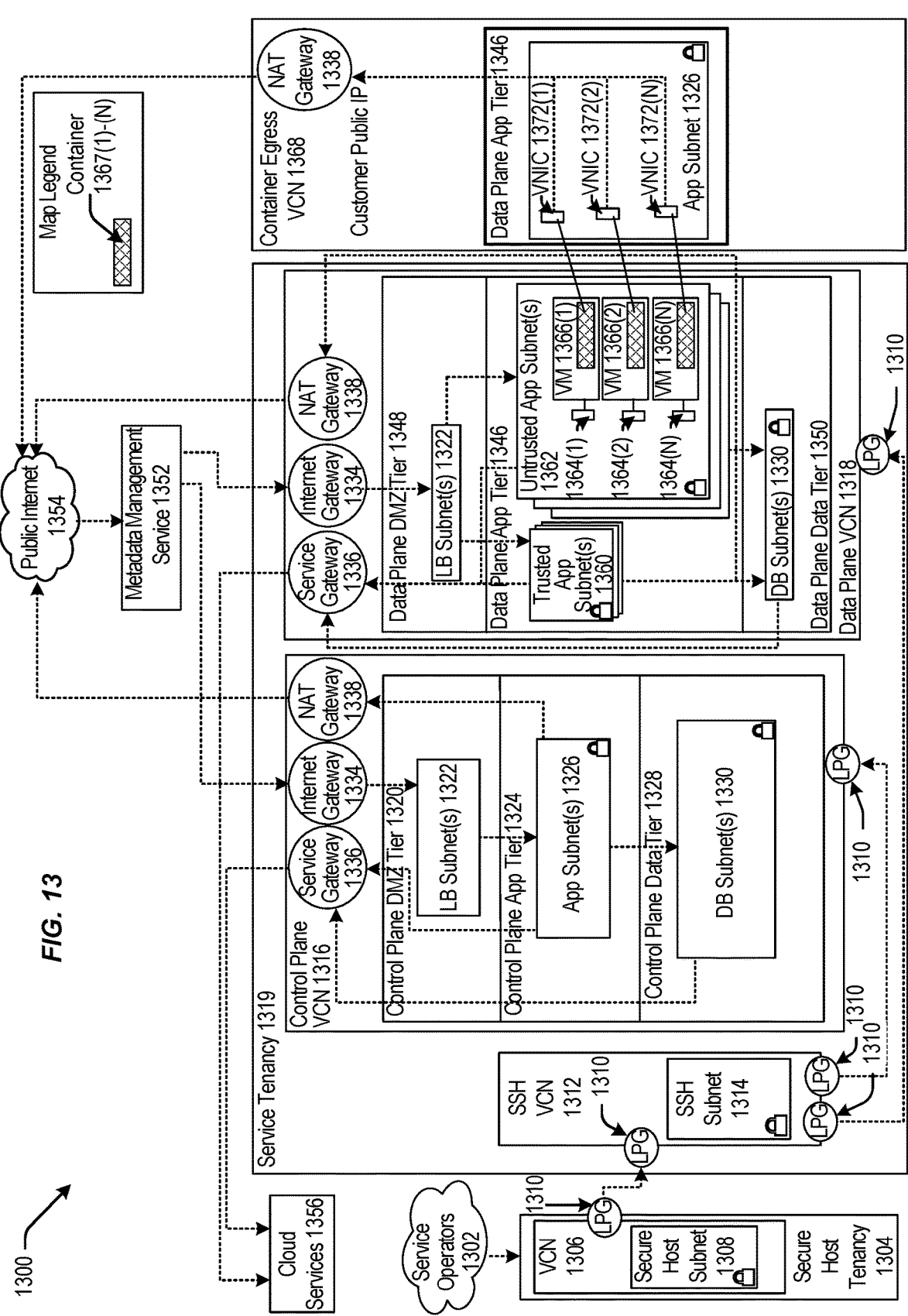
FIG. 13 is a block diagram illustrating another pattern for implementing a cloud infrastructure as a service system, according to at least one embodiment.

FIG. 13 is a block diagram 1300 illustrating another example pattern of an IaaS architecture, according to at least one embodiment. Service operators 1302 (e.g., service operators 1002 of FIG. 10) can be communicatively coupled to a secure host tenancy 1304 (e.g., the secure host tenancy 1004 of FIG. 10) that can include a virtual cloud network (VCN) 1306 (e.g., the VCN 1006 of FIG. 10) and a secure host subnet 1308 (e.g., the secure host subnet 1008 of FIG. 10). The VCN 1306 can include an LPG 1310 (e.g., the LPG 1010 of FIG. 10) that can be communicatively coupled to an SSH VCN 1312 (e.g., the SSH VCN 1012 of FIG. 10) via an LPG 1310 contained in the SSH VCN 1312. The SSH VCN 1312 can include an SSH subnet 1314 (e.g., the SSH subnet 1014 of FIG. 10), and the SSH VCN 1312 can be communicatively coupled to a control plane VCN 1316 (e.g., the control plane VCN 1016 of FIG. 10) via an LPG 1310 contained in the control plane VCN 1316 and to a data plane VCN 1318 (e.g., the data plane 1018 of FIG. 10) via an LPG 1310 contained in the data plane VCN 1318. The control plane VCN 1316 and the data plane VCN 1318 can be contained in a service tenancy 1319 (e.g., the service tenancy 1019 of FIG. 10).

The control plane VCN 1316 can include a control plane DMZ tier 1320 (e.g., the control plane DMZ tier 1020 of FIG. 10) that can include LB subnet(s) 1322 (e.g., LB subnet(s) 1022 of FIG. 10), a control plane app tier 1324 (e.g., the control plane app tier 1024 of FIG. 10) that can include app subnet(s) 1326 (e.g., app subnet(s) 1026 of FIG. 10), a control plane data tier 1328 (e.g., the control plane data tier 1028 of FIG. 10) that can include DB subnet(s) 1330 (e.g., DB subnet(s) 1230 of FIG. 12). The LB subnet(s) 1322 contained in the control plane DMZ tier 1320 can be communicatively coupled to the app subnet(s) 1326 contained in the control plane app tier 1324 and to an Internet gateway 1334 (e.g., the Internet gateway 1034 of FIG. 10) that can be contained in the control plane VCN 1316, and the app subnet(s) 1326 can be communicatively coupled to the DB subnet(s) 1330 contained in the control plane data tier 1328 and to a service gateway 1336 (e.g., the service gateway of FIG. 10) and a network address translation (NAT) gateway 1338 (e.g., the NAT gateway 1038 of FIG. 10). The control plane VCN 1316 can include the service gateway 1336 and the NAT gateway 1338.

The data plane VCN 1318 can include a data plane app tier 1346 (e.g., the data plane app tier 1046 of FIG. 10), a data plane DMZ tier 1348 (e.g., the data plane DMZ tier 1048 of FIG. 10), and a data plane data tier 1350 (e.g., the data plane data tier 1050 of FIG. 10). The data plane DMZ tier 1348 can include LB subnet(s) 1322 that can be communicatively coupled to trusted app subnet(s) 1360 (e.g., trusted app subnet(s) 1260 of FIG. 12) and untrusted app subnet(s) 1362 (e.g., untrusted app subnet(s) 1262 of FIG. 12) of the data plane app tier 1346 and the Internet gateway 1334 contained in the data plane VCN 1318. The trusted app subnet(s) 1360 can be communicatively coupled to the service gateway 1336 contained in the data plane VCN 1318, the NAT gateway 1338 contained in the data plane VCN 1318, and DB subnet(s) 1330 contained in the data plane data tier 1350. The untrusted app subnet(s) 1362 can be communicatively coupled to the service gateway 1336 contained in the data plane VCN 1318 and DB subnet(s) 1330 contained in the data plane data tier 1350. The data plane data tier 1350 can include DB subnet(s) 1330 that can be communicatively coupled to the service gateway 1336 contained in the data plane VCN 1318.

The untrusted app subnet(s) 1362 can include primary VNICs 1364(1)-(N) that can be communicatively coupled to tenant virtual machines (VMs) 1366(1)-(N) residing within the untrusted app subnet(s) 1362. Each tenant VM 1366(1)-(N) can run code in a respective container 1367(1)-(N), and be communicatively coupled to an app subnet 1326 that can be contained in a data plane app tier 1346 that can be contained in a container egress VCN 1368. Respective secondary VNICs 1372(1)-(N) can facilitate communication between the untrusted app subnet(s) 1362 contained in the data plane VCN 1318 and the app subnet contained in the container egress VCN 1368. The container egress VCN can include a NAT gateway 1338 that can be communicatively coupled to public Internet 1354 (e.g., public Internet 1054 of FIG. 10).

The Internet gateway 1334 contained in the control plane VCN 1316 and contained in the data plane VCN 1318 can be communicatively coupled to a metadata management service 1352 (e.g., the metadata management system 1052 of FIG. 10) that can be communicatively coupled to public Internet 1354. Public Internet 1354 can be communicatively coupled to the NAT gateway 1338 contained in the control plane VCN 1316 and contained in the data plane VCN 1318. The service gateway 1336 contained in the control plane VCN 1316 and contained in the data plane VCN 1318 can be communicatively couple to cloud services 1356.

In some examples, the pattern illustrated by the architecture of block diagram 1300 of FIG. 13 may be considered an exception to the pattern illustrated by the architecture of block diagram 1200 of FIG. 12 and may be desirable for a customer of the IaaS provider if the IaaS provider cannot directly communicate with the customer (e.g., a disconnected region). The respective containers 1367(1)-(N) that are contained in the VMs 1366(1)-(N) for each customer can be accessed in real-time by the customer. The containers 1367(1)-(N) may be configured to make calls to respective secondary VNICs 1372(1)-(N) contained in app subnet(s) 1326 of the data plane app tier 1346 that can be contained in the container egress VCN 1368. The secondary VNICs

1372(1)-(N) can transmit the calls to the NAT gateway 1338 that may transmit the calls to public Internet 1354. In this example, the containers 1367(1)-(N) that can be accessed in real-time by the customer can be isolated from the control plane VCN 1316 and can be isolated from other entities contained in the data plane VCN 1318. The containers 1367(1)-(N) may also be isolated from resources from other customers.

In other examples, the customer can use the containers 1367(1)-(N) to call cloud services 1356. In this example, the customer may run code in the containers 1367(1)-(N) that requests a service from cloud services 1356. The containers 1367(1)-(N) can transmit this request to the secondary VNICs 1372(1)-(N) that can transmit the request to the NAT gateway that can transmit the request to public Internet 1354. Public Internet 1354 can transmit the request to LB subnet(s) 1322 contained in the control plane VCN 1316 via the Internet gateway 1334. In response to determining the request is valid, the LB subnet(s) can transmit the request to app subnet(s) 1326 that can transmit the request to cloud services 1356 via the service gateway 1336.

It should be appreciated that IaaS architectures 1000, 1100, 1200, 1300 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 14:
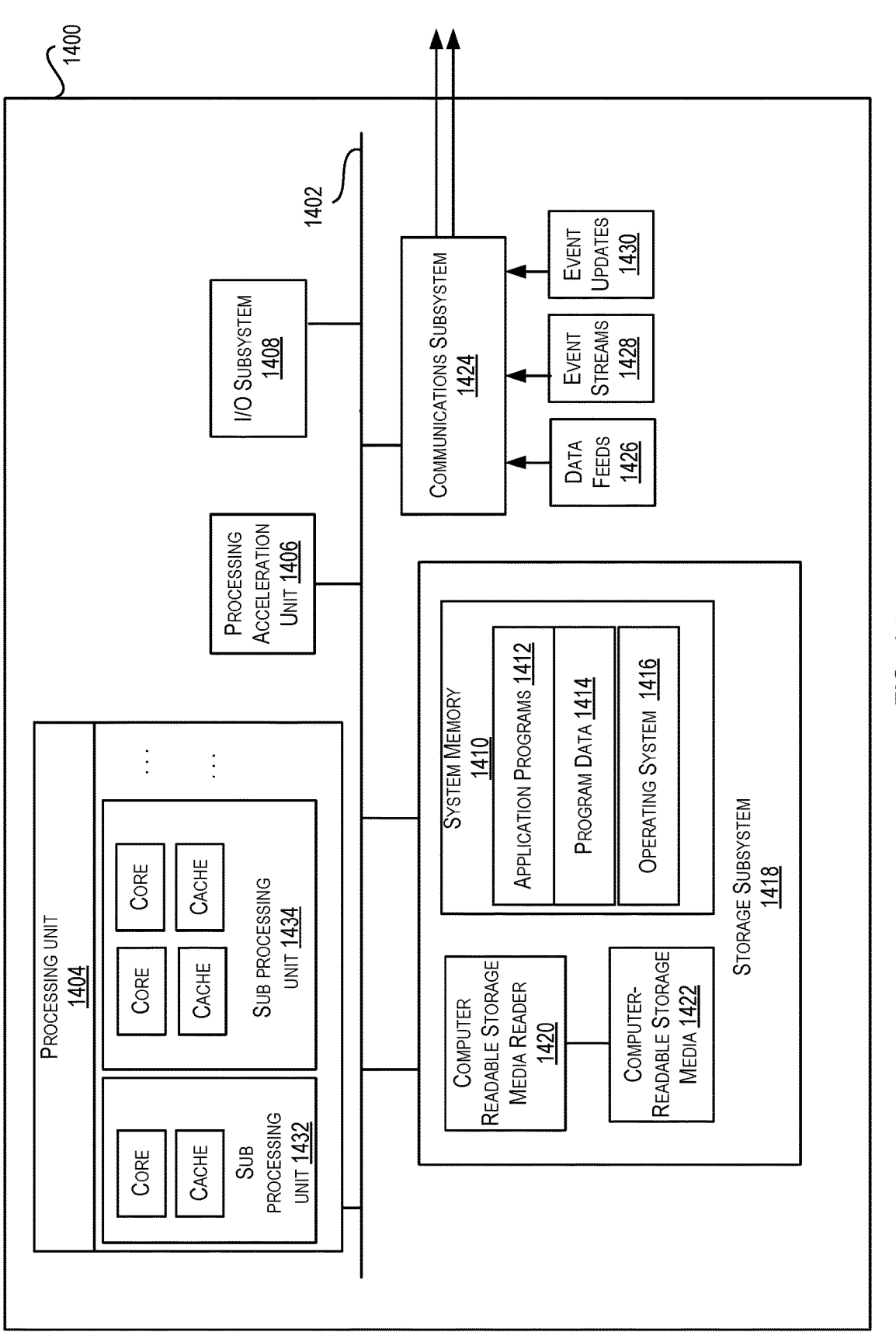
FIG. 14 is a block diagram illustrating an example computer system, according to at least one embodiment.

FIG. 14 illustrates an example computer system 1400, in which various embodiments may be implemented. The system 1400 may be used to implement any of the computer systems described above. As shown in the figure, computer system 1400 includes a processing unit 1404 that communicates with a number of peripheral subsystems via a bus subsystem 1402. These peripheral subsystems may include a processing acceleration unit 1406, an I/O subsystem 1408, a storage subsystem 1418 and a communications subsystem 1424. Storage subsystem 1418 includes tangible computer-readable storage media 1422 and a system memory 1410.

Bus subsystem 1402 provides a mechanism for letting the various components and subsystems of computer system 1400 communicate with each other as intended. Although bus subsystem 1402 is shown schematically as a single bus, alternative embodiments of the bus subsystem may utilize multiple buses. Bus subsystem 1402 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1404, which can be implemented as one or more integrated circuits (e.g., a conventional microprocessor or microcontroller), controls the operation of computer system 1400. One or more processors may be included in processing unit 1404. These processors may include single core or multicore processors. In certain embodiments, processing unit 1404 may be implemented as one or more independent processing units 1432 and/or 1434 with single or multicore processors included in each processing unit. In other embodiments, processing unit 1404 may also be implemented as a quad-core processing unit formed by integrating two dual-core processors into a single chip.

In various embodiments, processing unit 1404 can execute a variety of programs in response to program code and can maintain multiple concurrently executing programs or processes. At any given time, some or all of the program code to be executed can be resident in processor(s) 1404 and/or in storage subsystem 1418. Through suitable programming, processor(s) 1404 can provide various functionalities described above. Computer system 1400 may additionally include a processing acceleration unit 1406, which can include a digital signal processor (DSP), a special-purpose processor, and/or the like.

I/O subsystem 1408 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1400 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1400 may comprise a storage subsystem 1418 that comprises software elements, shown as being currently located within a system memory 1410. System memory 1410 may store program instructions that are loadable and executable on processing unit 1404, as well as data generated during the execution of these programs.

Depending on the configuration and type of computer system 1400, system memory 1410 may be volatile (such as random access memory (RAM)) and/or non-volatile (such as read-only memory (ROM), flash memory, etc.) The RAM typically contains data and/or program services that are immediately accessible to and/or presently being operated and executed by processing unit 1404. In some implementations, system memory 1410 may include multiple different types of memory, such as static random access memory (SRAM) or dynamic random access memory (DRAM). In some implementations, a basic input/output system (BIOS), containing the basic routines that help to transfer information between elements within computer system 1400, such as during start-up, may typically be stored in the ROM. By way of example, and not limitation, system memory 1410 also illustrates application programs 1412, which may include client applications, Web browsers, mid-tier applications, relational database management systems (RDBMS), etc., program data 1414, and an operating system 1416. By way of example, operating system 1416 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems.

Storage subsystem 1418 may also provide a tangible computer-readable storage medium for storing the basic programming and data constructs that provide the functionality of some embodiments. Software (programs, code services, instructions) that when executed by a processor provide the functionality described above may be stored in storage subsystem 1418. These software services or instructions may be executed by processing unit 1404. Storage subsystem 1418 may also provide a repository for storing data used in accordance with the present disclosure.

Storage subsystem 1400 may also include a computer-readable storage media reader 1420 that can further be connected to computer-readable storage media 1422. Together and, optionally, in combination with system memory 1410, computer-readable storage media 1422 may comprehensively represent remote, local, fixed, and/or removable storage devices plus storage media for temporarily and/or more permanently containing, storing, transmitting, and retrieving computer-readable information.

Computer-readable storage media 1422 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1400.

By way of example, computer-readable storage media 1422 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1422 may include, but is not limited to, Zip® drives, flash memory cards, universal serial bus (USB) flash drives, secure digital (SD) cards, DVD disks, digital video tape, and the like. Computer-readable storage media 1422 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program services, and other data for computer system 1400.

Communications subsystem 1424 provides an interface to other computer systems and networks. Communications subsystem 1424 serves as an interface for receiving data from and transmitting data to other systems from computer system 1400. For example, communications subsystem 1424 may enable computer system 1400 to connect to one or more devices via the Internet. In some embodiments communications subsystem 1424 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1424 can provide wired network connectivity (e.g., Ethernet) in addition to or instead of a wireless interface.

In some embodiments, communications subsystem 1424 may also receive input communication in the form of structured and/or unstructured data feeds 1426, event streams 1428, event updates 1430, and the like on behalf of one or more users who may use computer system 1400.

By way of example, communications subsystem 1424 may be configured to receive data feeds 1426 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1424 may also be configured to receive data in the form of continuous data streams, which may include event streams 1428 of real-time events and/or event updates 1430, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1424 may also be configured to output the structured and/or unstructured data feeds 1426, event streams 1428, event updates 1430, and the like to one or more databases that may be in communication with one or more streaming data source computers coupled to computer system 1400.

Computer system 1400 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1400 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:

receiving, by a computing device, a message identifying an instruction loaded onto an instruction cache of a secure processor;

transmitting, by the computing device, a control instruction to configure a kernel image to collect a first metric over a first time interval and a second metric over a second time interval, the first metric being generated based at least in part on the secure processor executing the instruction during the first time interval;

receiving, by the computing device, the first metric from the kernel image, the first metric being indicative of a transition of the secure processor from a non-secure state to a secure state;

receiving, by the computing device, the second metric from the kernel image, wherein the second metric is collected by the kernel image during the second time interval;

determining, by the computing device, an average value of a first value of the first metric and a second value of the second metric;

comparing, by the computing device, the average value to a second threshold;

determining, by the computing device, whether the secure processor is undergoing a transient attack or a sustained attack based at least in part on the comparison; and determining, by the computing device, whether to transmit the determination of whether the secure processor is undergoing the computing attack based at least in part on whether the computing attack is the transient attack or the sustained attack.

2. The method of claim 1, wherein the first metric is collected using a secure processer application programming interface (API).

3. The method of claim 1, wherein the first metric is collected using an instruction cache driver.

4. The method of claim 1, wherein the computing attack is an advanced persistent threat (APT) attack.

5. The method of claim 1, wherein the message is generated based at least in part on a memory mapping of the message.

6. The method of claim 1, wherein the secure processor is a first secure processor, and wherein a workload is rerouted from the first secure processor to a second secure processor based at least in part on transmitting the determination of whether the secure processor is undergoing the computing attack.

7. A computing device, comprising:

a processor; and a computer-readable medium including instructions that, when executed by the processor, cause the processor to perform operations comprising:

receiving a message identifying an instruction loaded onto an instruction cache of a secure processor;

transmitting a control instruction to configure a kernel image to collect a first metric over a first time interval and a second metric over a second time interval, the first metric being generated based at least in part on the secure processor executing the instruction during the first time interval;

receiving the first metric from the kernel image, the first metric being indicative of a transition of the secure processor from a non-secure state to a secure state;

receiving the second metric from the kernel image, wherein the second metric is collected by the kernel image during the second time interval;

determining an average value of a first value of the first metric and a second value of the second metric;

comparing the average value to a second threshold;

determining whether the secure processor is undergoing a transient attack or a sustained attack based at least in part on the comparison; and determining whether to transmit the determination of whether the secure processor is undergoing the computing attack based at least in part on whether the computing attack is the transient attack or the sustained attack.

8. The computing device of claim 7, wherein the first metric is collected using a secure processer application programming interface (API).

9. The computing device of claim 7, wherein the first metric is collected using an instruction cache driver.

10. The computing device of claim 7, wherein the computing attack is an advanced persistent threat (APT) attack.

11. The computing device of claim 7, wherein instructions that, when executed by the processor, further cause the processor to perform operations comprising:

determining an average value of a first value of the first metric and a second value of the second metric;

comparing the average value to a second threshold;

determining whether the secure processor is undergoing a transient attack or a sustained attack based at least in part on the comparison; and determining whether to transmit the determination of whether the secure processor is undergoing the computing attack based at least in part on whether the computing attack is the transient attack or the sustained attack.

12. The computing device of claim 7, wherein the message is generated based at least in part on a memory mapping of the message.

13. The computing device of claim 7, wherein the secure processor is a first secure processor, and wherein a workload is rerouted from the first secure processor to a second secure processor based at least in part on transmitting the determination of whether the secure processor is undergoing the computing attack.

14. A non-transitory computer-readable medium including stored thereon a sequence of instructions that, when executed by a processor, causes the processor to perform operations comprising:

receiving a message identifying an instruction loaded onto an instruction cache of a secure processor;

transmitting a control instruction to configure a kernel image to collect a first metric over a first time interval and a second metric over a second time interval, the first metric being generated based at least in part on the secure processor executing the instruction during the first time interval;

receiving the first metric from the kernel image, the first metric being indicative of a transition of the secure processor from a non-secure state to a secure state;

receiving the second metric from the kernel image, wherein the second metric is collected by the kernel image during the second time interval;

determining an average value of a first value of the first metric and a second value of the second metric;

comparing the average value to a second threshold;

determining whether the secure processor is undergoing a transient attack or a sustained attack based at least in part on the comparison; and determining whether to transmit the determination of whether the secure processor is undergoing the computing attack based at least in part on whether the computing attack is the transient attack or the sustained attack.

15. The non-transitory computer-readable medium of claim 14, wherein the first metric is collected using a secure processer application programming interface (API).

16. The non-transitory computer-readable medium of claim 14, wherein the first metric is collected using an instruction cache driver.

17. The non-transitory computer-readable medium of claim 14, wherein the computing attack is an advanced persistent threat (APT) attack.

18. The non-transitory computer-readable medium of claim 14, wherein the message is generated based at least in part on a memory mapping of the message.

* * * * *